United States Patent
Wong et al.

(10) Patent No.: US 10,618,153 B2
(45) Date of Patent: Apr. 14, 2020

(54) FUEL SYSTEM FOR A COMBUSTION DRIVEN FASTENER HAND TOOL

(71) Applicant: Power Tech Staple and Nail, Inc., Monterey Park, CA (US)

(72) Inventors: Raymond Wong, Alhambra, CA (US); Shih-Yi Chen, Taoyuan (TW); Chin-Chuan Chen, Taoyuan (TW)

(73) Assignee: Power Tech Staple and Nail, Inc., Monterey Park, CA (US)

( * ) Notice: Subject to any disclaimer, the term of this patent is extended or adjusted under 35 U.S.C. 154(b) by 196 days.

(21) Appl. No.: 15/933,961

(22) Filed: Mar. 23, 2018

(65) Prior Publication Data

US 2018/0207778 A1   Jul. 26, 2018

Related U.S. Application Data

(63) Continuation of application No. 14/839,765, filed on Aug. 28, 2015, now Pat. No. 9,950,414.

(60) Provisional application No. 62/043,279, filed on Aug. 28, 2014.

(51) Int. Cl.
*B25C 1/08* (2006.01)
*B25C 1/04* (2006.01)
*F02B 19/10* (2006.01)
*F02B 71/00* (2006.01)
*F02B 19/02* (2006.01)
*F02B 63/02* (2006.01)

(52) U.S. Cl.
CPC ............. *B25C 1/08* (2013.01); *B25C 1/045* (2013.01); *F02B 19/1023* (2013.01); *F02B 71/00* (2013.01); *B25C 1/04* (2013.01); *F02B 19/02* (2013.01); *F02B 63/02* (2013.01); *Y02T 10/125* (2013.01)

(58) Field of Classification Search
CPC .. B25C 1/00; B25C 1/04; B25C 1/041; B25C 1/045; B25C 1/008; B25C 1/08; F17C 2270/0763; F17C 13/04; F02B 63/02; F02B 71/04
USPC ............... 227/8, 2, 9, 10, 120, 130, 156; 123/46 SC, 46 R, 46 H
See application file for complete search history.

(56) References Cited

U.S. PATENT DOCUMENTS

| | | |
|---|---|---|
| 4,483,280 A | 11/1984 | Nikolich |
| 4,712,379 A | 12/1987 | Adams et al. |
| 4,717,060 A | 1/1988 | Cotta |
| 5,199,626 A | 4/1993 | Terayama et al. |
| 5,626,274 A | 5/1997 | Shkolnikov et al. |
| 5,680,980 A | 10/1997 | Robinson |
| 5,687,899 A | 11/1997 | Dohi et al. |

(Continued)

*Primary Examiner* — Scott A Smith
(74) *Attorney, Agent, or Firm* — Canady & Lortz LLP; Bradley K. Lortz

(57) ABSTRACT

A combustion driven fastener hand tool is disclosed having a fuel system subassembly including a fuel nozzle and a metering valve, disposed in a common bore of the combustion driven fastener apparatus. The metering valve comprises a hollow cylindrical housing having a cap at each end and a central dual valve stem therebetween. Movement of the dual central valve stem closes an inlet valve at one end and opens an outlet valve at an opposite end in a coordinated manner to release a metered amount of fuel through the outlet valve while preventing additional fuel through the inlet valve. The combustion driven fastener hand tool includes numerous other features affording improvements over the prior art.

20 Claims, 36 Drawing Sheets

(56) References Cited

U.S. PATENT DOCUMENTS

| | | |
|---|---|---|
| 5,713,313 A | 2/1998 | Berry |
| 5,722,578 A | 3/1998 | Van Erden et al. |
| 5,794,831 A | 8/1998 | Velan et al. |
| 5,799,855 A | 9/1998 | Veoukas et al. |
| 5,806,747 A | 9/1998 | Erden et al. |
| 5,860,580 A | 1/1999 | Velan et al. |
| 5,897,043 A | 4/1999 | Veoukas et al. |
| 5,909,836 A | 6/1999 | Shkolnikov et al. |
| 5,911,350 A | 6/1999 | Bolger et al. |
| 5,971,245 A | 10/1999 | Robinson |
| 5,975,397 A | 11/1999 | Van Erden et al. |
| 5,975,569 A | 11/1999 | Starozhitsky et al. |
| 6,012,622 A | 1/2000 | Weinger et al. |
| 6,102,270 A | 8/2000 | Robinson |
| 6,108,908 A | 8/2000 | Starozhitsky et al. |
| 6,109,165 A | 8/2000 | Velan et al. |
| 6,145,723 A | 11/2000 | Gupta |
| 6,145,724 A | 11/2000 | Shkolnikov et al. |
| 6,164,510 A | 12/2000 | Deiso et al. |
| 6,176,412 B1 | 1/2001 | Weinger et al. |
| 6,179,192 B1 | 1/2001 | Weinger et al. |
| 6,260,519 B1 | 7/2001 | Phillips |
| 6,505,767 B2 | 1/2003 | Thieleke et al. |
| 6,520,397 B1 | 2/2003 | Moeller |
| 6,523,860 B1 | 2/2003 | Shkolnikov et al. |
| 6,584,945 B2 | 7/2003 | Porth |
| 6,619,527 B1 | 9/2003 | Moeller |
| 6,626,344 B2 | 9/2003 | Shkolnikov et al. |
| 6,671,163 B2 | 12/2003 | Shkolnikov et al. |
| 6,685,193 B2 | 2/2004 | Roberts et al. |
| 6,715,655 B1 | 4/2004 | Taylor et al. |
| 6,722,550 B1 | 4/2004 | Ricordi et al. |
| 6,755,159 B1 | 6/2004 | Adams et al. |
| 6,755,335 B2 | 6/2004 | Fielitz |
| 6,783,047 B2 | 8/2004 | Granacher |
| 6,796,476 B2 | 9/2004 | Birk et al. |
| 6,796,478 B2 | 9/2004 | Shkolnikov et al. |
| 6,840,033 B2 | 1/2005 | Adams |
| 6,843,401 B2 | 1/2005 | Favre-Bulle |
| 6,860,243 B2 | 3/2005 | Doherty et al. |
| 6,863,045 B2 | 3/2005 | Ricordi |
| 6,874,452 B2 | 4/2005 | Adams |
| 6,886,730 B2 | 5/2005 | Fujisawa et al. |
| 6,892,524 B1 | 5/2005 | Van Erden et al. |
| 6,938,810 B2 | 9/2005 | Robinson |
| 6,964,362 B2 | 11/2005 | Shkolnikov et al. |
| 6,966,478 B2 | 11/2005 | Adams et al. |
| 6,974,063 B2 | 12/2005 | Schiestl et al. |
| 7,040,520 B2 | 5/2006 | Turk |
| 7,040,521 B2 | 5/2006 | Kolodzej et al. |
| 7,066,117 B2 | 6/2006 | Nishikawa et al. |
| 7,107,944 B1 | 9/2006 | Heinzen |
| 7,118,018 B2 | 10/2006 | Turk |
| 7,124,923 B2 | 10/2006 | Panasik |
| 7,140,331 B1 | 11/2006 | Heinzen |
| 7,163,134 B2 | 1/2007 | Moeller et al. |
| 7,201,301 B2 | 4/2007 | Moeller et al. |
| 7,201,302 B2 | 4/2007 | Panasik et al. |
| 7,222,765 B2 | 5/2007 | Robinson |
| 7,275,505 B2 | 10/2007 | Moeller et al. |
| 7,290,691 B1 | 11/2007 | Wen |
| 7,296,719 B1 | 11/2007 | Taylor et al. |
| 7,299,963 B2 | 11/2007 | Moeller et al. |
| 7,314,025 B2 | 1/2008 | Shkolnikov et al. |
| 7,341,171 B2 | 3/2008 | Moeller et al. |
| 7,377,413 B2 | 5/2008 | Wen |
| 7,383,974 B2 | 6/2008 | Moeller et al. |
| 7,392,922 B2 | 7/2008 | Vanstaan et al. |
| 7,431,185 B2 | 10/2008 | Moeller et al. |
| 7,478,740 B2 | 1/2009 | Shea et al. |
| 7,487,898 B2 | 2/2009 | Moeller et al. |
| 7,497,271 B2 | 3/2009 | Moeller et al. |
| 7,510,105 B2 | 3/2009 | Moeller et al. |
| 7,568,602 B2 | 8/2009 | Turk |
| 7,584,723 B2 | 9/2009 | Shkolnikov et al. |
| 7,587,897 B2 | 9/2009 | Strong |
| 7,588,096 B2 | 9/2009 | Panasik |
| 7,591,236 B2 | 9/2009 | Moeller et al. |
| 7,591,249 B2 | 9/2009 | Wagdy et al. |
| 7,603,854 B2 | 10/2009 | Strong |
| 7,617,957 B2 | 11/2009 | Holderfield et al. |
| 7,634,979 B2 | 12/2009 | Adams |
| 7,654,429 B2 | 2/2010 | Shea et al. |
| 7,661,568 B2 | 2/2010 | Vanstaan et al. |
| 7,673,779 B2 | 3/2010 | Moeller et al. |
| 7,757,920 B2 | 7/2010 | Shea et al. |
| 7,770,772 B2 | 8/2010 | Adams |
| 7,784,560 B2 | 8/2010 | Mina et al. |
| 7,802,500 B2 | 9/2010 | Kolodziej et al. |
| 7,841,501 B2 | 11/2010 | Panasik et al. |
| 7,866,519 B2 | 1/2011 | Cortez, Jr. |
| 7,918,375 B2 | 4/2011 | Johnson et al. |
| 7,926,733 B2 | 4/2011 | Micheli |
| 7,938,104 B2 | 5/2011 | Adams |
| 7,946,463 B2 | 5/2011 | Moeller |
| 8,002,160 B2 | 8/2011 | Larkin et al. |
| 8,016,046 B2 | 9/2011 | Zhao et al. |
| 8,042,718 B2 | 10/2011 | Taylor et al. |
| 8,070,031 B2 | 12/2011 | Moeller et al. |
| 8,087,394 B2 | 1/2012 | Adams |
| 8,113,403 B2 | 2/2012 | Tanaka et al. |
| 8,152,038 B2 | 4/2012 | Rouger et al. |
| 8,191,751 B2 | 6/2012 | Moeller et al. |
| 8,205,582 B2 | 6/2012 | Adams |
| 8,220,686 B2 | 7/2012 | Kestner et al. |
| 8,261,847 B2 | 9/2012 | Ford et al. |
| 8,267,298 B2 | 9/2012 | Zahner et al. |
| 8,276,798 B2 | 10/2012 | Moeller et al. |
| 8,302,831 B2 | 11/2012 | Taylor et al. |
| 8,302,832 B2 | 11/2012 | Porth et al. |
| 8,313,545 B2 | 11/2012 | Panasik et al. |
| 8,336,749 B2 | 12/2012 | Largo |
| 8,347,832 B2 | 1/2013 | Adams |
| 8,348,118 B2 | 1/2013 | Segura |
| 8,376,204 B2 | 2/2013 | Buetow et al. |
| 8,511,264 B2 | 8/2013 | Adams |
| 8,523,037 B2 | 9/2013 | Segura |
| D691,012 S | 10/2013 | Buetow et al. |
| 8,579,175 B2 | 11/2013 | Mina |
| 9,862,137 B2 * | 1/2018 | Dickert ................ B29C 57/045 |
| 9,950,414 B2 * | 4/2018 | Wong ........................ B25C 1/08 |
| 10,000,007 B2 * | 6/2018 | Dickert ................... B29C 57/04 |
| 2004/0182337 A1 | 9/2004 | Schiestl et al. |
| 2005/0035171 A1 | 2/2005 | Ohtsu et al. |
| 2006/0065219 A1 | 3/2006 | Hertlein et al. |
| 2007/0075113 A1 * | 4/2007 | Tillinghast ............. B25C 1/043 227/130 |
| 2012/0210974 A1 | 8/2012 | Adams |

* cited by examiner

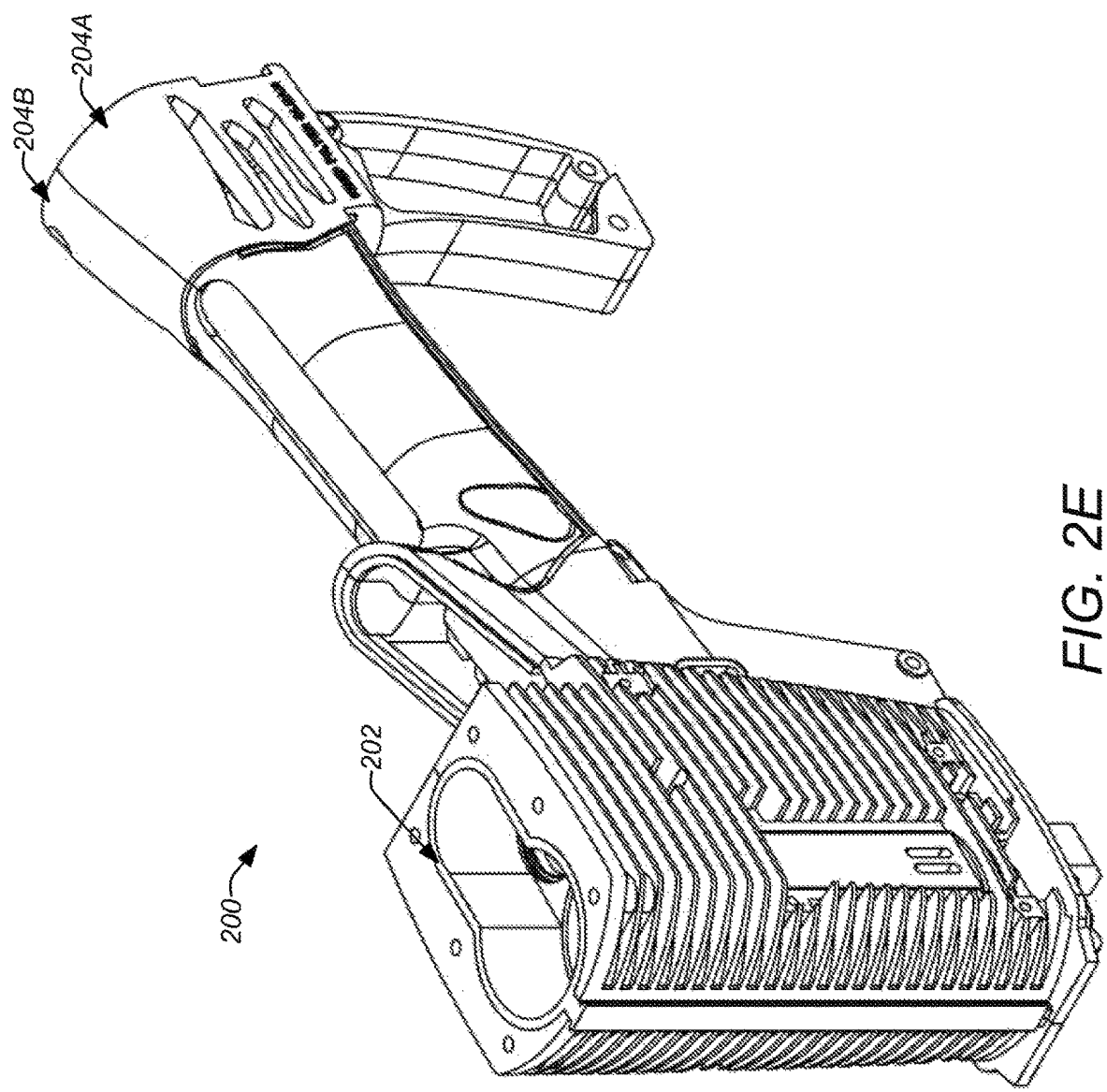

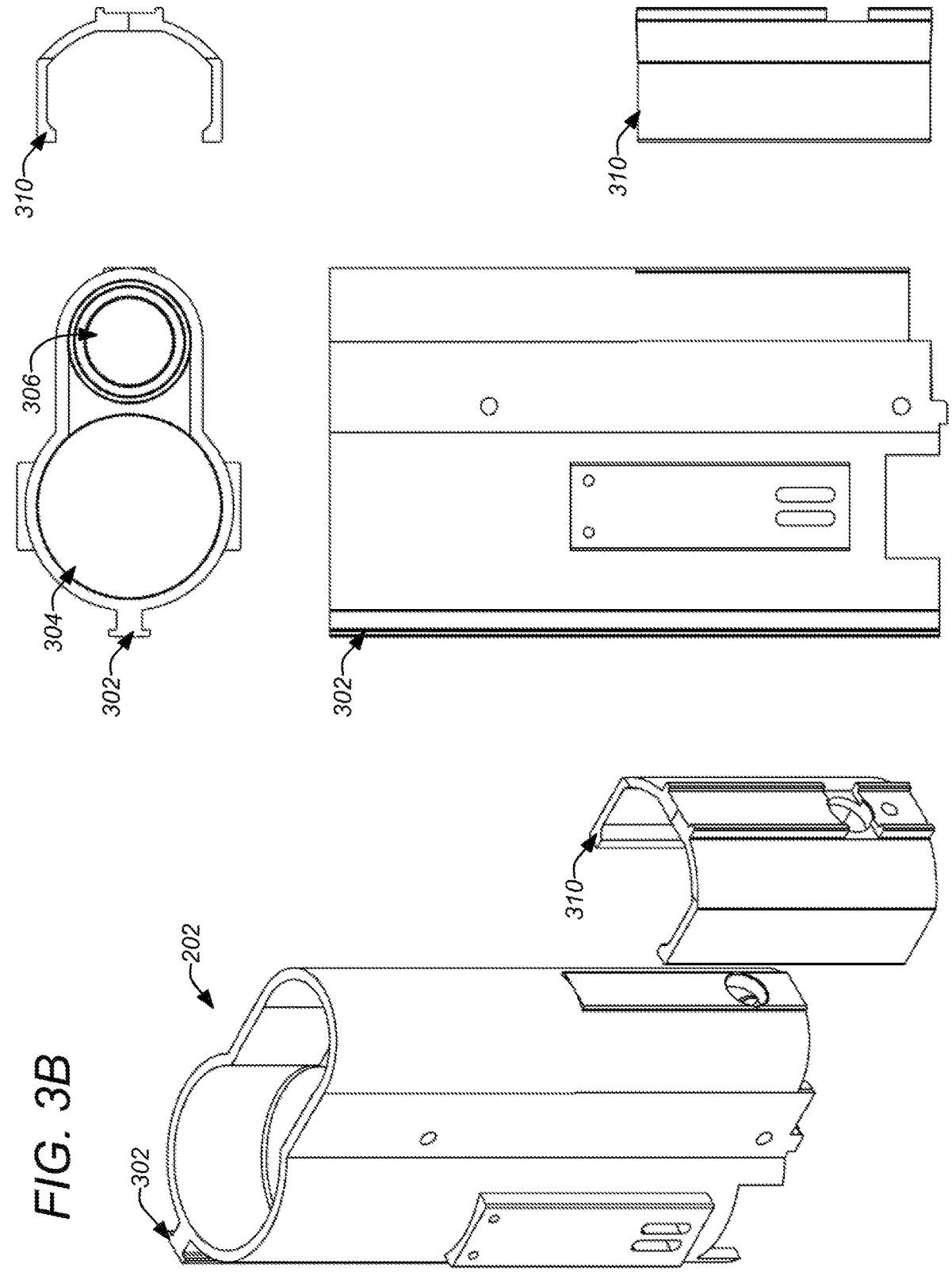

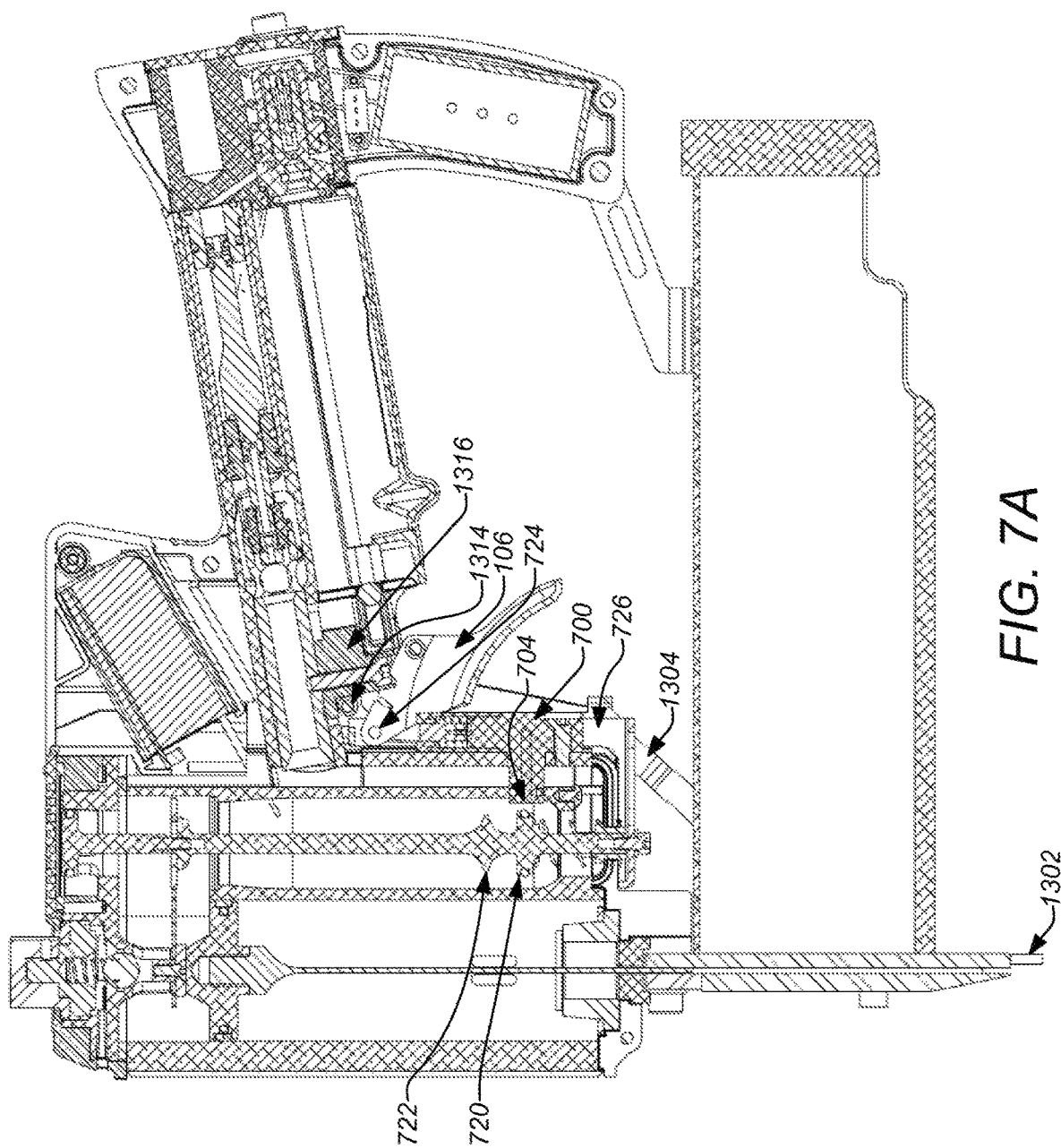

FUEL SYSTEM FOR A COMBUSTION DRIVEN FASTENER HAND TOOL

CROSS-REFERENCE TO RELATED APPLICATIONS

This continuation application claims the benefit under 35 § 120 of the following and commonly assigned U.S. utility patent application:

U.S. patent application Ser. No. 14/839,765, filed Aug. 28, 2015 and entitled "COMBUSTION DRIVEN FASTENER HAND TOOL." by Wong et. al., now U.S. Pat. No. 9,950,414, which application claims the benefit of U.S. Provisional Patent Application No. 62/043,279, filed Aug. 28, 2014, and entitled "COMBUSTION DRIVEN FASTENER HAND TOOL," by Wong et al., which applications are both incorporated by reference herein.

BACKGROUND OF THE INVENTION

1. Field of the Invention

This invention relates to powered fastener driving hand tools. Particularly, this invention relates to a combustion driven fastener hand tool.

2. Description of the Related Art

Powered fastener driving tools, e.g. nail guns, have existed for decades. Perhaps not coincidentally, the first commercial nail gun was introduced in 1950 after World War II wherein the technology for rapidly firing projectiles was greatly advanced. The first nail guns were pneumatic, driven by compressed air. Although pneumatic power is still the most prevalent, over time fastener driving tools have been developed using other means of power, such as electric motors, solonoids, combustibles, e.g. gas or explosive powder, have also been developed. Some development of technology related to powered fastener drivers, and particularly combustion driven fastener tools. However, there is still much need for further development.

U.S. Patent Application Publication No. 2012/0210974, published Aug. 23, 2012, by Adams, discloses a gas-powered tool motor includes a combustion chamber with an intake valve at one end, an exhaust valve at another end, and a control plate or control valve between two portions of the combustion chamber A piston or other positive displacement device is in communication with the combustion chamber. The intake and exhaust valves have closure members that are movable along a common axis in tandem between collective open positions for recharging the combustion chamber with the fuel and air mixture and collective closed positions for detonating the fuel and air mixture in the combustion chamber and displacing the positive displacement device. The control plate or control valve supports limited air flows from a first portion of the combustion chamber to a second portion of the combustion chamber even in the closed position of the control valve for supporting two-stage combustion.

In view of the foregoing, there is a need in the art for apparatuses and methods improving the operation of combustion driven fastener hand tools. There is also a need for such apparatuses and methods that operate reliably and efficiently over many uses and at a reduced cost. In addition, there is a need for such apparatuses and methods to allow comfortable and precise control of combustion driven fastener hand tools. There is further a need for such systems and apparatuses to be inexpensively manufacturable and readily servicable. These and other needs are met by the present invention as detailed hereafter.

SUMMARY OF THE INVENTION

A combustion driven fastener hand tool is disclosed having a fuel system subassembly including a fuel nozzle and a metering valve, disposed in a common bore of the combustion driven fastener apparatus. The metering valve comprises a hollow cylindrical housing having a cap at each end and a central dual valve stem therebetween. Movement of the dual central valve stem closes an inlet valve at one end and opens an outlet valve at an opposite end in a coordinated manner to release a metered amount of fuel through the outlet valve while preventing additional fuel through the inlet valve. The combustion driven fastener hand tool includes numerous other features affording improvements over the prior art.

A typical combustion hand tool embodiment of the invention comprises a combustion driven fastener apparatus, including a front body section including a first bore and a second bore comprising a combustion chamber, the first bore parallel to the second bore, where a passage couples the combustion chamber to the first bore at an end of the first bore, a piston disposed in the first bore to drive a fastener, and a primary housing comprising a left half and a right half enclosing the front body section. The combustion driven fastener apparatus is capable of having a fuel and air mixture driven under pressure into the combustion chamber and ignited to generate pressure through the passage and force the piston in the first bore to drive the fastener. Typically, the front body section comprises an extruded component and the left half and the right half of the primary housing comprise cast components. The left half and the right half of the primary housing and the front body section can comprise aluminum.

In some embodiments, the front body section can include a third bore comprising a pathway for the fuel and air mixture to the combustion chamber. Alternately, a pathway for the fuel and air mixture to the combustion chamber can be formed by attaching a crescent piece to an outer wall of the second bore of the front body section.

In further embodiments, the front body section can include a rail parallel to the first bore and the second bore, the rail engaging an outer housing having one or more mating slots to the rail.

In some embodiments, a hand grip section can also be included having a fuel system bore for housing fuel system components of the combustion driven fastener apparatus. The hand grip section comprises an extruded component.

In a similar manner, a typical method embodiments of the invention comprises making a combustion driven fastener apparatus, including extruding a front body section including a first bore and a second bore comprising a combustion chamber, the first bore parallel to the second bore, where a passage couples the combustion chamber to the first bore at an end of the first bore, disposing a piston in the first bore to drive a fastener, casting a primary housing comprising a left half and a right half, and enclosing the front body section with the left half and the right half of the primary housing. The combustion driven fastener apparatus is capable of having a fuel and air mixture driven under pressure into the combustion chamber and ignited to generate pressure through the passage and force the piston in the first bore to drive the fastener. This method embodiment can be further modified consistent with any of the apparatuses described herein.

In a similar manner, a combustion driven fastener apparatus embodiment of the invention can include a front body section including a first bore and a second bore comprising a combustion chamber means for temporarily holding and directing a fuel and air mixture as it combusts to generate pressure, the first bore parallel to the second bore, where a passage couples the pressure from the combustion chamber means to the first bore at an end of the first bore, a piston means for driving a fastener under the pressure from the fuel and air mixture combusting, the piston means disposed in the first bore, and a primary housing means for enclosing the front body section. This apparatus embodiment can be further modified consistent with any of the apparatuses and/or methods described herein.

Another embodiment of the invention comprises a combustion driven fastener apparatus, including a sliding link disposed in a channel of a nose piece of the combustion driven fastener apparatus and an armature rotatable about a pinned joint, the armature having a first arm coupled to the sliding link by a slotted joint and a second arm arranged to operate a fuel charging valve of the combustion driven fastener apparatus. Pressing the nose piece against a surface moves the sliding link coupled to the first arm of the armature by the slotted joint rotating the armature which causes the second arm to operate the fuel charging valve. Typically, the sliding link is trapped in the channel of the nose piece such that the sliding link is movable a limited distance in one dimension. The fuel charging valve can be spring loaded against the second arm in order to return the armature and in turn the sliding link to respective starting positions after the nose piece is no longer pressed against the surface. The slotted joint can comprise a roller bushing coupled to the sliding link which rolls in a slot in the first arm of the armature. In addition, the second arm of the armature comprises two parallel extensions connected by an axial extension proximate the pinned joint. The pinned joint can comprise two screws collinearly aligned with one through each parallel extension and a wide roller bushing can be coupled between ends of the two parallel extensions. The wide roller bushing can be disposed against an operating lever of the fuel charging valve.

Similarly, another embodiment of the invention comprises a method of making a combustion driven fastener apparatus, including disposing a sliding link in a channel of a nose piece of the combustion driven fastener apparatus, and pinning an armature to be rotatable about a rotational joint, the armature having a first arm coupled to the sliding link by a slotted joint and a second arm arranged to operate a fuel charging valve of the combustion driven fastener apparatus. Pressing the nose piece against a surface moves the sliding link coupled to the first arm of the armature by the slotted joint rotating the armature which causes the second arm to operate the fuel charging valve. This method embodiment can be further modified consistent with any of the apparatuses described herein.

Yet another embodiment of the invention comprises an igniter for a combustion driven fastener apparatus including a housing including a longitudinal section and a transverse section, a switch for triggering a spark to be generated at the ignition spark point the switch disposed at an end of the longitudinal section, and a conductor within the transverse section having a spark point exposed at an end of the transverse section of the housing, the transverse section comprising an electrical insulator. The remote ignition control electronics can be electrically coupled to the conductor and the switch and send a high voltage pulse to the spark point of the conductor to generate the spark in response to receiving a trigger signal from the switch.

In addition, the switch can comprise an optical switch that is opened and closed by allowing and preventing light to contact a detector. The optical switch can include a spring loaded movable component having a window therethrough in front of the detector. The spark can be generated between the spark point and an edge of a disc affixed to a valve stem within a chamber of the combustion driven fastener apparatus. The disc can be tapered to an edge at an outer diameter. Movement of the valve stem can operate at least one valve of the chamber such that the disc is disposed proximate to the spark point after the valve stem is positioned to close the at least one valve. Typically, the spark point is disposed proximate to an end of the chamber. The stem and the disc are electrically conductive to close a circuit allowing the spark to be generated.

Similarly, another embodiment of the invention comprises a method of making an igniter for a combustion driven fastener apparatus, including producing a housing including a longitudinal section and a transverse section, the transverse section comprising an electrical insulator, disposing a switch at an end of the longitudinal section, the switch for triggering a spark to be generated at the ignition spark point, and disposing a conductor within the transverse section having a spark point exposed at an end of the transverse section of the housing. This method embodiment can be further modified consistent with any of the apparatuses described herein.

Yet another embodiment of the invention comprises a combustion driven fastener apparatus, including a front cover of a hand grip having a hinged engagement to a back portion of the hand grip along a side of the front cover, the hinged engagement allowing both rotational movement about a hinge axis and axial movement along the hinge axis of the front cover, and a catch disposed in the back portion on the opposite side of the hinged engagement for releasably engaging the front cover of the hand grip after the front cover is rotated about the hinge axis, closed against the back portion, and moved axially along the hinged axis. An interior pocket of the front cover of the hand grip can support a fuel cartridge for the combustion driven fastener apparatus. The front cover can be designed such that axial movement of the front cover along the hinged axis pushes the fuel cartridge such that a valved port of the fuel cartridge engages a mating port within the hand grip.

In further embodiments, a feature can be disposed on the front cover on an opposite side of the hinged engagement, and a mating feature disposed on the back portion of the hand grip on the opposite side of the hinged engagement, wherein the feature engages the mating feature after the front cover is rotated about the hinge axis, closed against the back portion, and moved axially along the hinged axis and engagement of the feature and mating feature prevents rotational movement about the hinge axis but allows axial movement along the hinge axis. The feature can comprise a pin extending from the front cover on an opposite side of the hinged engagement and parallel to the hinge axis and the mating feature can comprise a hole in the back portion of the hand grip. The pin engages a hole in the back portion of the hand grip after the front cover is rotated about the hinge axis, closed against the back portion, and moved axially along the hinged axis. The catch can comprise a spring loaded button catch.

Similarly, another embodiment of the invention comprises a method of making a combustion driven fastener apparatus, including producing a front cover of a hand grip having a hinged engagement to a back portion of the hand grip along a side of the front cover, the hinged engagement allowing both rotational movement about a hinge axis and axial movement along the hinge axis of the front cover, and disposing a catch in the back portion on the opposite side of the hinged engagement for releasably engaging the front cover of the hand grip after the front cover is rotated about the hinge axis, closed against the back portion, and moved axially along the hinged axis. This method embodiment can be further modified consistent with any of the apparatuses described herein.

Another embodiment of the invention comprises a combustion driven fastener apparatus, having a fuel system subassembly including a fuel nozzle having a metered fuel input port and fuel and an air mixture output port, the fuel nozzle disposed in a bore of the combustion driven fastener apparatus, and a metering valve having a fuel input port and a metered fuel output port, the metering valve disposed in the bore with the metered fuel output port coupled to the metered fuel input port, the metering valve comprising a hollow cylindrical housing having a cap at each end and a central dual valve stem therebetween. Movement of the dual central valve stem closes an inlet valve at one end and opens an outlet valve at an opposite end in a coordinated manner to release a metered amount of fuel through the outlet valve while preventing additional fuel through the inlet valve. The bore can include a step to locate the metering valve at a set position along a length of the bore. The fuel nozzle and the metering valve can be cylindrically configured with the metering valve having a larger maximum diameter than the fuel nozzle. The bore can be disposed in a hand grip section of the combustion driven fastener apparatus. The cap at each end can comprise a common cap design having an annular groove.

In further embodiments, the fuel system subassembly can include a biasing spring disposed between the fuel nozzle and the metering valve and moving the fuel nozzle towards the metering valve compresses the biasing spring therebetween such that the metered fuel input port of the fuel nozzle pushes against the metered fuel output port of the metering valve causing the movement of the dual central valve stem. The dual central valve stem can be configured such that fuel pressure behind the fuel input port of the metering valve can forces the dual central valve stem such the that inlet valve is normally open and the outlet valve is normally closed. The fuel system subassembly can further include a pressure regulator having a fuel cartridge input port and a fuel output port, the pressure regulator disposed in the bore with the fuel output port coupled to the fuel input port of the metering valve.

In further embodiments, a cap fastened over the bore in the hand grip section can be used to secure the fuel system subassembly in place, the cap including a clip portion extending from an end of the hand grip section adjacent and parallel along a side of the hand grip section. The cap can be fastened over the bore by a plurality of screws in a symmetric pattern such that the cap can be secured in two alternate orientations, one with the clip portion along a left side of the hand grip section and another with the clip portion along a right side of the hand grip section.

Similarly, another embodiment of the invention comprises a method of making a combustion driven fastener apparatus, comprising a fuel system subassembly including disposing a fuel nozzle in a bore of the combustion driven fastener apparatus, the fuel nozzle having a metered fuel input port and fuel and an air mixture output port, and disposing a metering valve in the bore behind the fuel nozzle with the metered fuel output port coupled to the metered fuel input port, the metering valve having a fuel input port and a metered fuel output port, the metering valve comprising a hollow cylindrical housing having a cap at each end and a central dual valve stem therebetween. Movement of the dual central valve stem closes an inlet valve at one end and opens an outlet valve at an opposite end in a coordinated manner to release a metered amount of fuel through the outlet valve while preventing additional fuel through the inlet valve. This method embodiment can be further modified consistent with any of the apparatuses described herein.

Another embodiment of the invention comprises a combustion driven fastener apparatus, including a front body section including a first bore and a second bore together comprising a combustion chamber, the first bore parallel to the second bore, where a passage couples the combustion chamber to the first bore at an end of the first bore, a piston and driver disposed in the first bore to drive a fastener, a valve stem assembly disposed in the second bore to control fuel charging of combustion chamber, and a top cap assembly fastened to the front body section over the first bore and the second bore. The piston and driver are removable from the first bore and the valve stem assembly is removable from the second bore after unfastening the top cap assembly. Typically, a conductor is disposed in a wall of the second bore of the combustion chamber such that the conductor does not interfere with removal of the valve stem assembly. The valve stem assembly can include a disc affixed to a central stem that is electrically coupled to a spark generator such that a spark can be generated between the disc and the conductor.

In further embodiment piston bumper can be disposed in the first bore behind the piston and driver, the piston bumper having a groove for engaging an edge of a clip installed through a slot in a side of the front body section. Typically, the piston bumper comprises an elastomeric material. The edge of the clip can comprise an interior semi-circular edge and the piston bumper can comprise a cylindrical shape with the groove disposed around an outer circumference of the cylindrical shape.

Similarly, another embodiment of the invention comprises a method of making a combustion driven fastener apparatus, comprising producing a front body section including a first bore and a second bore comprising a combustion chamber, the first bore parallel to the second bore, where a passage couples the combustion chamber to the first bore at an end of the first bore, disposing a piston and driver in the first bore to drive a fastener, disposing a valve stem assembly in the second bore to control fuel charging of combustion chamber, and fastening a top cap assembly to the front body section over the first bore and the second bore. The piston and driver are removable from the first bore and the valve stem assembly is removable from the second bore after unfastening the top cap assembly. This method embodiment can be further modified consistent with any of the apparatuses described herein.

Yet another embodiment of the invention comprises a combustion driven fastener apparatus, including a valve stem disposed in a combustion chamber, a disc affixed to the valve stem, and a conductor having a spark point disposed in a wall of the combustion chamber. A spark is generated between the spark point and an edge of the disc to ignite combustion with the combustion chamber. Typically, the disc is tapered to an edge at an outer diameter and the conductor does not extend into the combustion chamber allowing removal of the vale stem from one end of the combustion chamber without moving the conductor. The valve stem can be movable with the combustion chamber to operate at least one valve such that the disc is disposed proximate to the spark point after the valve stem is positioned to close the at least one valve. The spark point is typically disposed proximate to an end of the chamber and the valve stem and the disc are electrically conductive to close a circuit allowing the spark to be generated.

Similarly, another embodiment of the invention comprises a method of making a combustion driven fastener apparatus, comprising affixing a disc to a valve stem, disposing the valve stem in a combustion chamber, and disposing a conductor in a wall of the combustion chamber, the conductor having a spark point at an end exposed to the combustion chamber. A spark is generated between the spark point and an edge of the disc to ignite combustion with the combustion chamber. This method embodiment can be further modified consistent with any of the apparatuses described herein.

Yet another embodiment of the invention comprises a combustion driven fastener apparatus, including a front body section including at least one bore comprising a combustion chamber and a T-rail disposed on an exterior surface of the front body section and parallel to the at least one bore, and an exterior housing comprising a left portion and a right portion enclosing the front body section, the left portion having a left groove to engage a left side of the Trail of the front body section and the right portion having a right groove to engage a right side of the T-rail of the front body section. Typically, the exterior housing comprises a plastic part and the front body section comprises an extruded metal part.

In further embodiments a primary housing including a left side and a right side, the left side and the right can enclose the front body section on either side of the T-rail with the T-rail extending past an exterior surface of the primary housing to engage the left groove and the right groove of the exterior housing. Typically, the primary housing comprises a cast metal part. The front body section can comprise an exterior surface having one or more reed valves affixed to the exterior surface adjacent to and covering one or more exhaust ports and one or more standoffs on an interior surface of the exterior housing prevents the one or more reed valves from opening too far causing permanent deformation of the one or more reed valves.

Similarly, another embodiment of the invention comprises a method of making a combustion driven fastener apparatus, comprising forming a T-rail on an exterior surface of a front body section, the front body section including at least one bore comprising a combustion chamber and the T-rail being parallel to the at least one bore a front body section, and enclosing the front body section with an exterior housing comprising a left portion and a right portion, the left portion having a left groove to engage a left side of the T-rail of the front body section and the right portion having a right groove to engage a right side of the T-rail of the front body section. This method embodiment can be further modified consistent with any of the apparatuses described herein.

BRIEF DESCRIPTION OF THE DRAWINGS

Referring now to the drawings in which like reference numbers represent corresponding parts throughout:

FIGS. 2A-2E illustrate exploded, cross section, and assembly views of the primary housing, front body section, and hand grip section of an exemplary combustion driven fastener hand tool embodiment of the invention;

FIGS. 3A and 3B illustrate detailed views of the front body section of an exemplary combustion driven fastener hand tool embodiment of the invention;

FIGS. 7A and 7B illustrate cutaway views of a fuel charging operation of an exemplary combustion driven fastener hand tool embodiment of the invention;

DETAILED DESCRIPTION OF THE PREFERRED EMBODIMENT

1. Overview

Figure 1B:
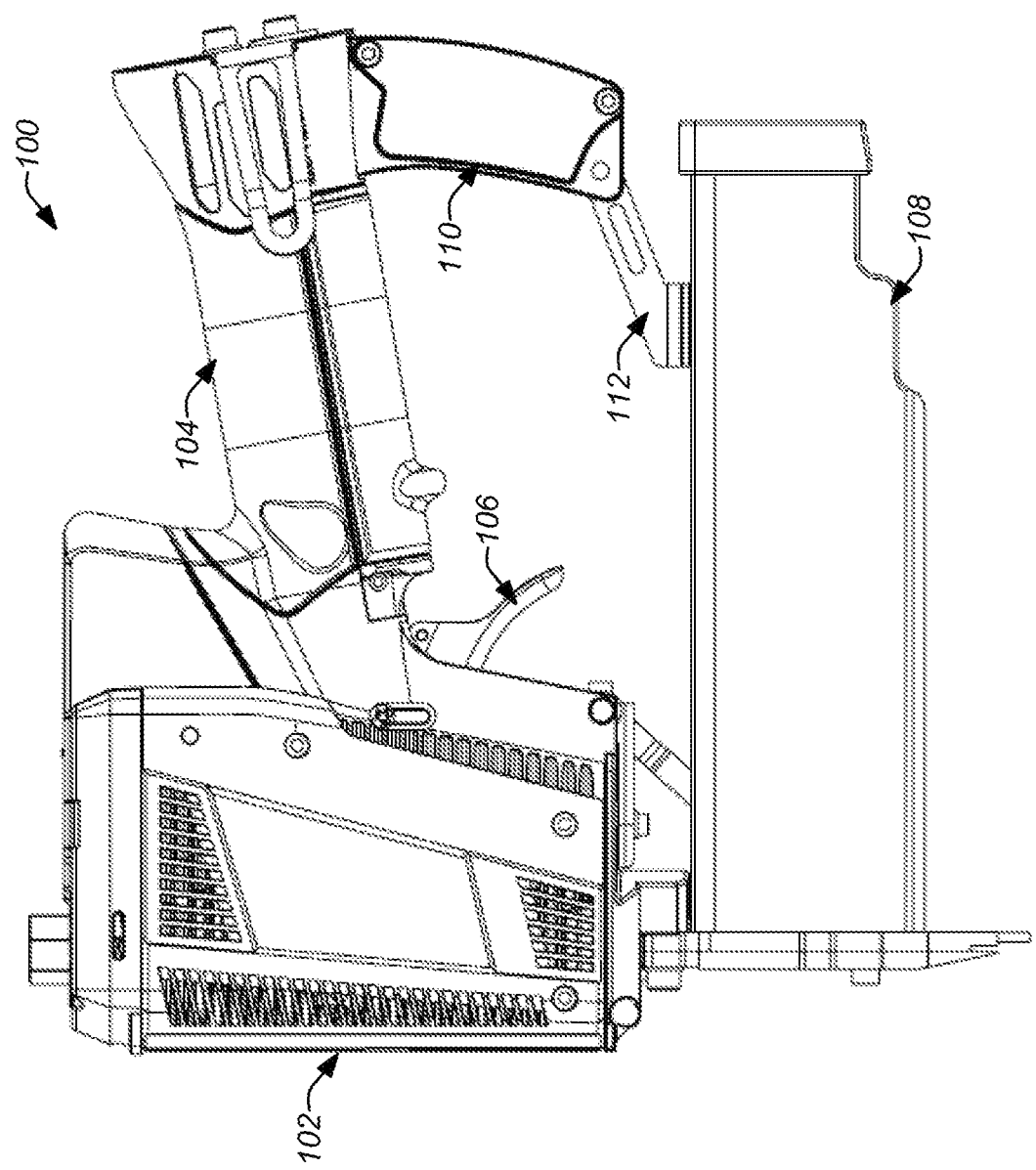
FIGS. 1A-1E illustrate front, side, bottom, top, and isometric views, respectively, of an exemplary combustion driven fastener hand tool embodiment of the invention.
Figure 1A:
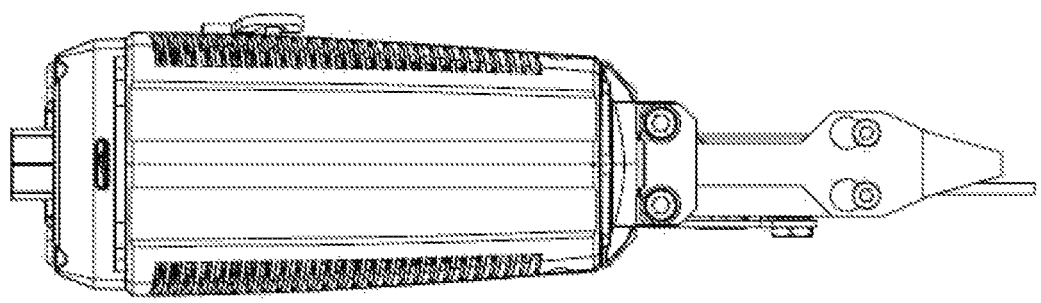
Figure 1C:
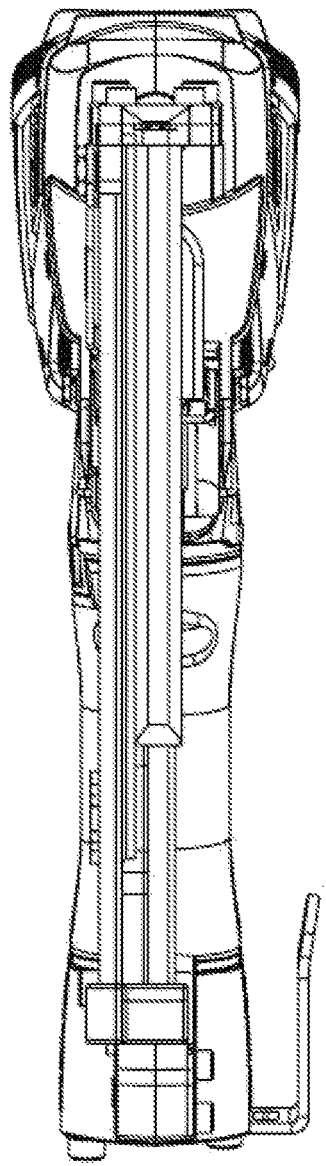
Figure 1D:
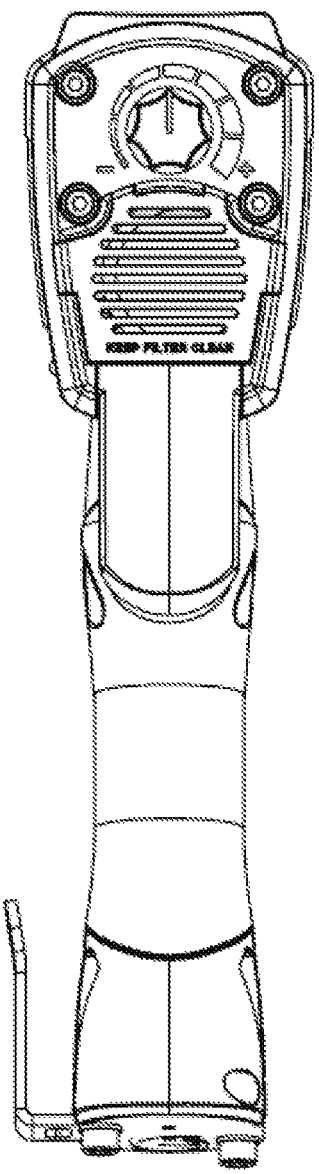

As previously mentioned, embodiments of the invention are directed to a combustion driven fastener hand tool having an extruded front body component including two to three primary bores. A first bore forms a cylinder for the piston which drives the fastener. A second bore forms a primary combustion chamber in which a fuel and air mixture is ignited and directed into the adjacent piston cylinder. The extruded front body component can be enclosed in two cast primary housing pieces. An exterior housing, e.g. which may be molded plastic, then encloses the entire assembly. A novel "T-rail" of the front body section slides into a matching slot on the exterior housing. The combustion driven fastener hand tool includes numerous other features affording improvements over the prior art.

Embodiments of the invention can implement many improvements in the novel front body section of the combustion driven fastener hand tool. Within the front body section embodiments of the invention can employ a readily replaceable piston driver and piston bumper for combustion driven fastener hand tool. The piston driver is readily accessible from a single removable top cap assembly. After removing the piston driver, the piston bumper is easily removable, held in place by a simple clip. Novel exhaust valves can also be employed into a front body section having stops integrated into an exterior housing of a combustion driven fastener hand tool.

In addition, embodiments of the invention can employ a novel integrated hand grip and fuel system designed for easy serviceable access and fuel cartridge replacement in a combustion driven fastener hand tool. An integrated igniter switch and spark point can also be employed and can operate with a novel disc on a fuel valve stem to create the spark gap for ignition. A novel, simple and versatile unitary fuel passage baffle can also be employed. Embodiments of the invention can also employ a novel integrated ignition battery compartment and structure support for combustion driven fastener hand tool. A novel fuel charging safety linkage can also be implemented in a combustion driven fastener hand tool.

FIGS. 1A-1E illustrate front, side, bottom, top, and isometric views, respectively, of an exemplary combustion driven fastener hand tool embodiment of the invention. The exemplary combustion driven fastener hand tool 100 includes a front body 102 which houses the piston and combustion chambers. A grip portion 104 and a trigger 106 extend from the front body 102. The grip portion 104 is held by the user during operation. The grip portion 104 also encloses a fuel cartridge and includes a pressure regulator and fuel mixing components of the fuel system. A fastener strip carrier 108 is disposed laterally from one end of the front body 102. Typically, a fastener strip comprises a series of separate slender metal fasteners disposed side by side and lightly bonded together, e.g. by a tape layer, as is known in the art. A battery carrier section 110 extends from the end of the grip portion 104 towards the end of the fastener strip carrier 108. Additional structural support is afforded by a bracket 112 coupled between the battery carry section 110 and the fastener strip carrier 108.

It should be noted that multiple example detailed designs are shown in the accompanying figures in order illustrate the various inventive aspects. For example, variations on the different housings may be illustrated. However, the relevant inventive features are not limited to any particular design unless otherwise noted.

2. Body Structure for Combustion Driven Fastener Hand Tool

As previously mentioned, embodiments of the invention can incorporate a number of novel features into a front body section of an combustion driven fastener band tool. Embodiments of the invention can incorporate an efficient arrangement of components of four principle sections which enables lower cost manufacturing and the production of more accurate, precise parts which also provides for better alignment of the parts. Two of the four elements can be cheaply manufactured as extruded components, a front body section for the piston and combustion chambers and a hand grip section for the fuel delivery and mixing components. The extruded front body and hand grip sections are enclosed by two cast halves of the primary housing. In general, the number of critical dimensions affecting the function and performance of the device is reduced and isolated to the extruded elements. Accordingly, this arrangement arrangement of components leads to improved function and reliability and greatly reduced overall cost of the tool.

FIGS. 2A-2E illustrate exploded, cross section, and assembly views of the primary housing 204A, 204B, front body section 202, and hand grip section 206 of an exemplary combustion driven fastener hand tool 200 embodiment of the invention. The front body section 202 is enclosed within two halves of primary housing 204A, 204B. See FIGS. 2A-2B. The primary housing 204A, 204B can also enclose the hand grip section 206. Manufacturing costs are reduced by employing extrusions for the front body section 202 and the hand grip section 206 and a casting for the primary housing 204A, 204B. See FIGS. 2C-2E. The extruded hand grip section 206 comprises a bore which is used to house the fuel metering and mixing components as described hereafter. All parts can be produced from aluminum or any other suitable material known in the art.

One important aspect employed in embodiments of the invention involves a front body section. This component can be readily produced as an extruded element, e.g. from aluminum, with minimal finish machining and includes three parallel bores through its length. A first bore forms the cylinder for the piston which drives the fastener, a second bore forms the primary combustion chamber, and a third bore forms a fuel mixture flow path. Typically, the piston cylinder and the combustion chamber bores are cylindrical whereas the fuel mixture flow path bore is "quasi-crescent" shaped, disposed along a portion of the outer surface of the combustion chamber bore. In an alternate embodiment the front body section may be extruded having two parallel bores, a first bore forming the cylinder for the piston which drives the fastener and a second bore forming the primary combustion chamber. In this case, the fuel mixture flow path adjacent o the combustion chamber is formed by attaching a separate crescent shaped component to the extruded component. Forming the front body section as an extruded part having at least two parallel bores affords an inexpensive, yet precise part.

Figure 3A:
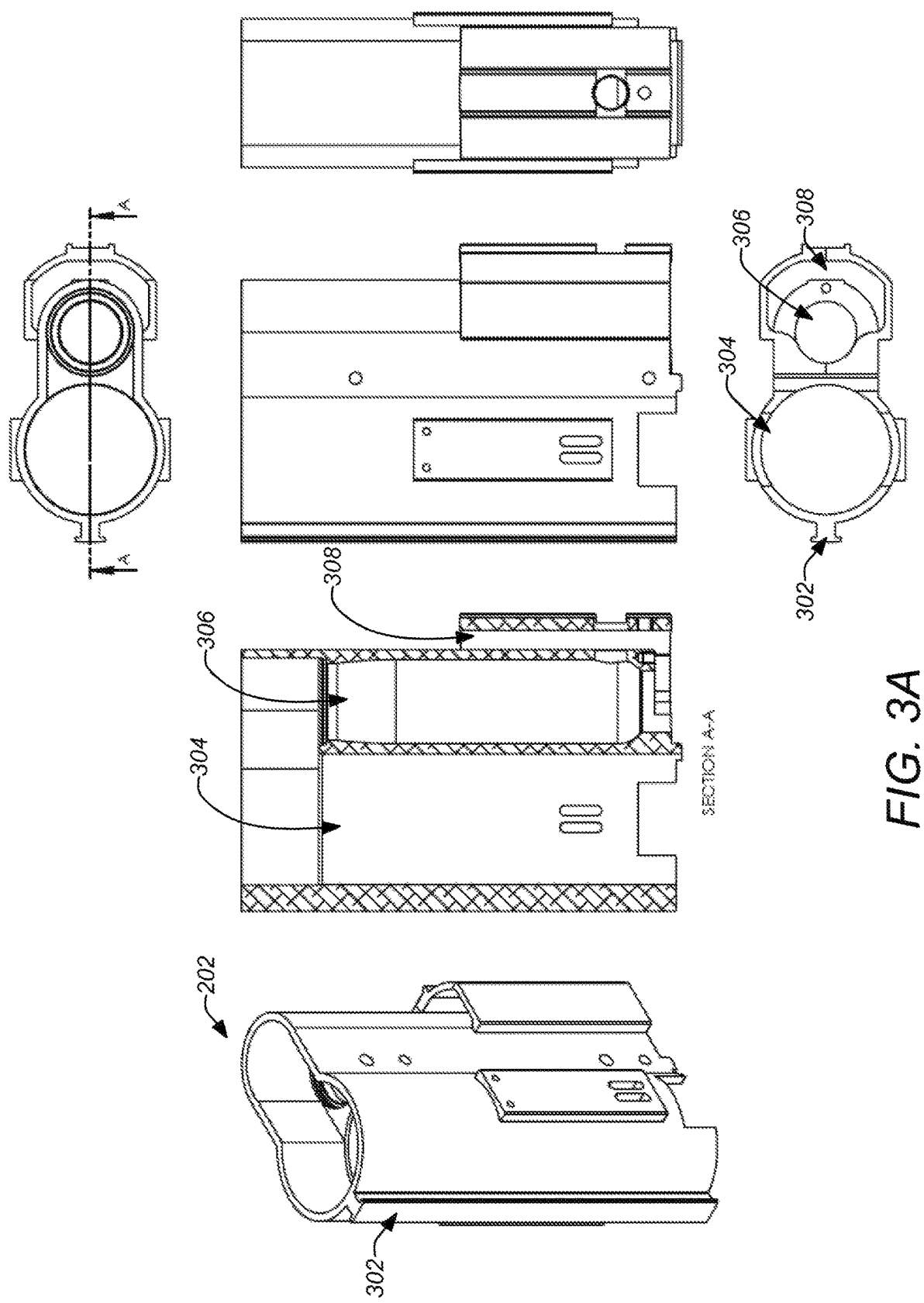

FIGS. 3A and 3B illustrate detailed views of the front body section 202 of an exemplary combustion driven fastener hand tool embodiment of the invention. As previously described, the front body section 202 comprises up to three bores which can be inexpensively manufactured as an extruded part. A first bore 304 is used for the piston (which may be alternately described as a secondary combustion chamber). A second bore 306 is used as the primary combustion chamber. The first and second bores 304, 306 are substantially cylindrical. An optional third bore 308 can also be formed having a crescent shape which is used as a fuel and air mixture pathway to the primary combustion chamber. See FIG. 3A. Instead of the third bore 308, the fuel and air mixture pathway can be alternately formed as a separate crescent shape part 310 which is attached to the outer wall of the second bore 306.

The front body section 202 can also be extruded to include a "T-rail" section 302 parallel and adjacent to the piston bore. This T-rail 302 is used to couple to an exterior housing of the complete hand tool assembly (which covers the cast primary housing halves). Incorporating the T-rail 302 in the front body section allows for quick assembly/disassembly and alignment of components without adding any cost, i.e. no additional fasteners or machining, as would be required with a cast part instead of an extrusion. The T-rail 302 is produced as part of the overall extrusion. The exterior housing includes matching slots which engage the T-rail 302 secure the exterior housing over the cast primary housing halves. It should be noted that rail 302 need not be configured as a "T"; other rail geometries may also be used provided matching slots are produced on the exterior housing parts.

Figure 4A:
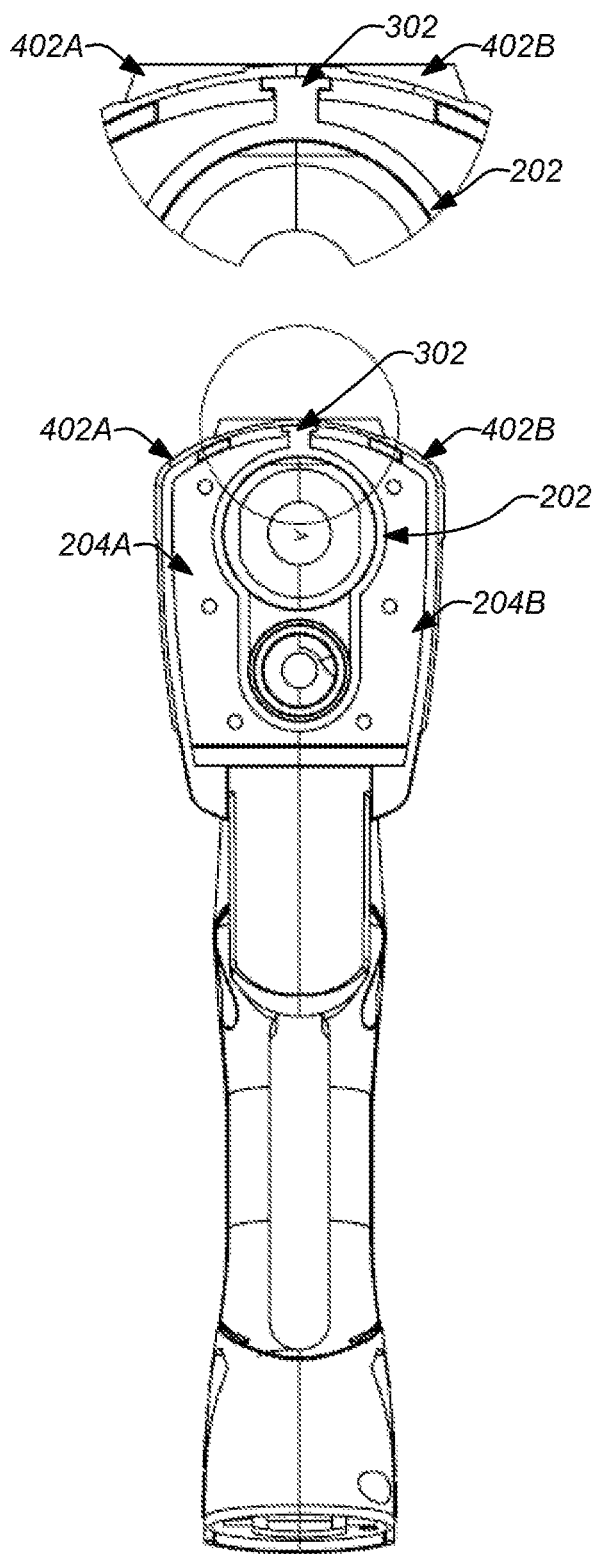
FIGS. 4A and 4B illustrate detailed views of the front body section rail and attachment to the housing of an exemplary combustion driven fastener hand tool embodiment of the invention.
Figure 4B:
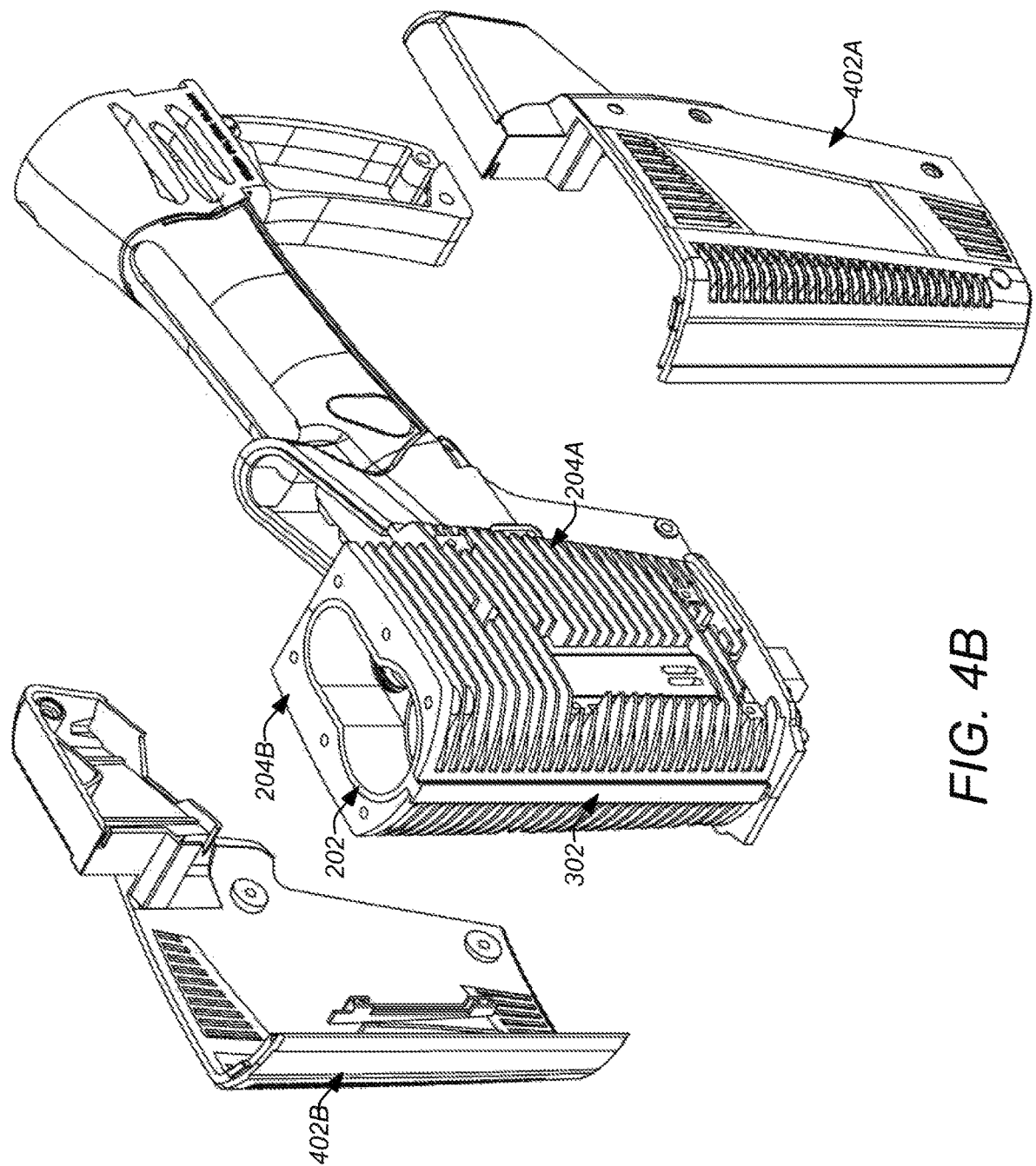

FIGS. 4A and 4B illustrate detailed views of the rail 302 of the front body section 202 and attachment to the exterior housing 402A, 402B of an exemplary combustion driven fastener hand tool embodiment of the invention. The rail 302 built into the front body section 202 is used to secure and align together the front body section 202 with the primary housing 204A, 204B and the exterior housing 402A, 402B. The halves of the exterior housing 402A, 402B is nested over the primary housing 204A, 204B and have slots which engage the rail 302 of the front body section 202.

3. Hand Grip and Fuel System for Combustion Driven Fastener Hand Tool

Embodiments of the invention can employ a pressurized liquid fuel cartridge, e.g. propane, which can be readily purchased off the shelf and replaced by the user. The fuel cartridge is cylindrical having a valved port at the center of one end of the cylinder. It should be noted that embodiments of the invention are not limited to any particular fuel and the inventive concepts described herein can be readily adapted to a range of suitable combustible fuels as will be appreciated by those skilled in the art.

Another important feature of an embodiment of the invention involves the fuel storage and delivery components of the hand tool. The standardized fuel cartridge loading is conveniently loaded and unloaded from the tool using a storage compartment and loading/unloading mechanism integrated into the hand grip of the tool. The front portion of the hand grip (whereon the user's fingers rest in use) is hinged along one side and includes spring loaded button catch on the opposite side. In addition to rotation about the hinge axis, the hinge design allows for some displacement along the hinge axis. The hand grip cover is fully opened by first releasing the spring loaded button catch, sliding the cover forward along the hinge axis and then opening the hand grip cover by rotating it about the hinge axis.

Figure 5A:
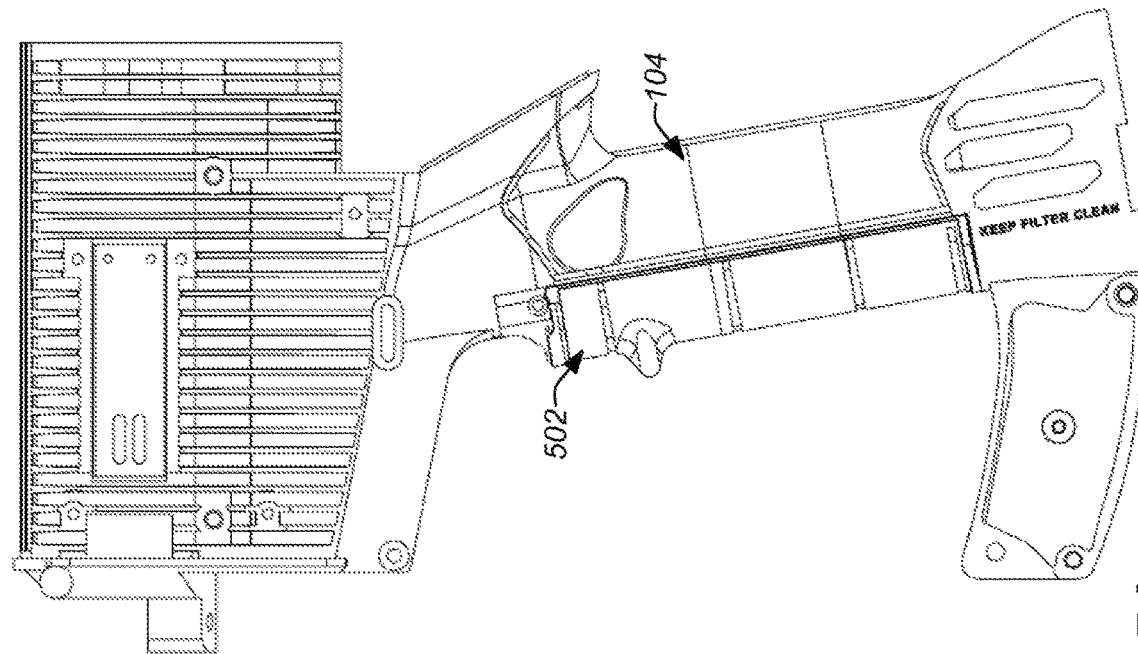
FIGS. 5A-5C illustrate detailed views of the fuel cartridge housing and hand grip assembly of an exemplary combustion driven fastener hand tool embodiment of the invention.
Figure 5A:
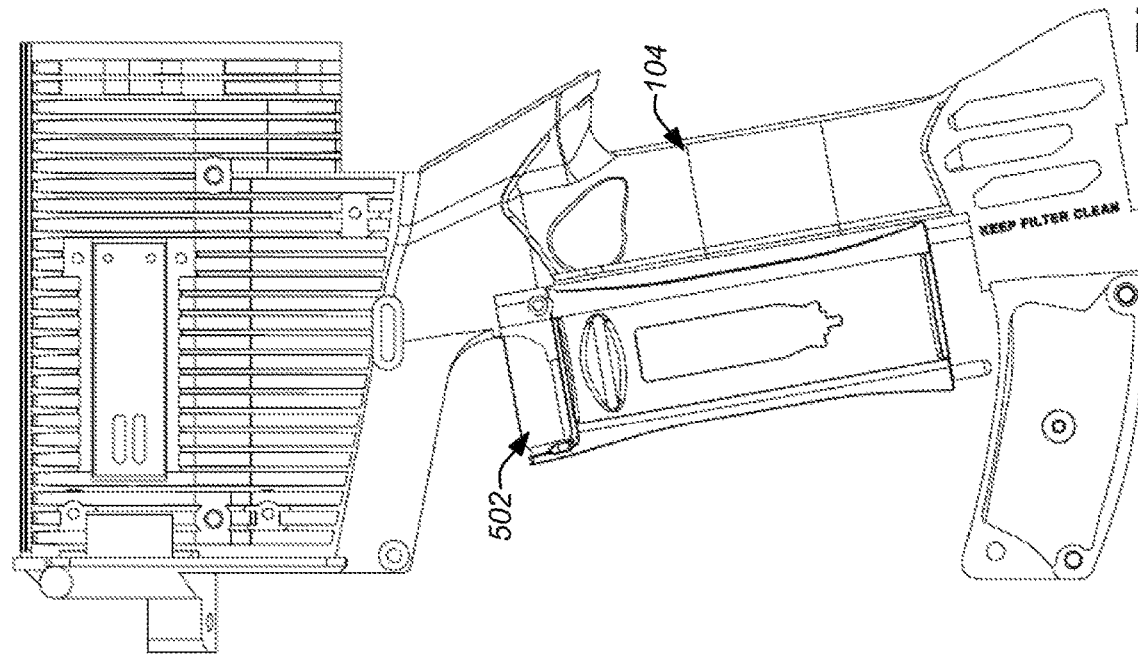
Figure 5B:
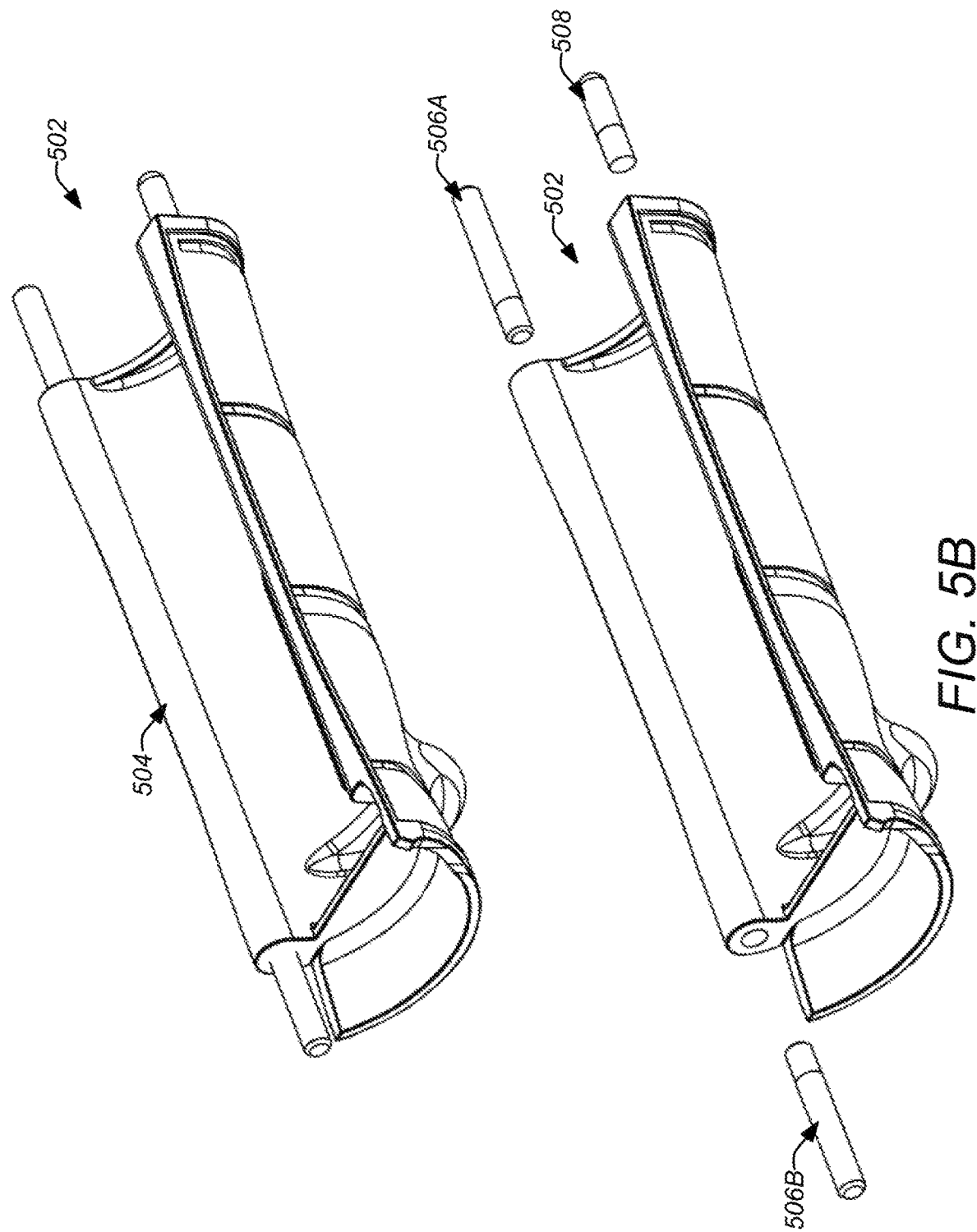
Figure 5C:
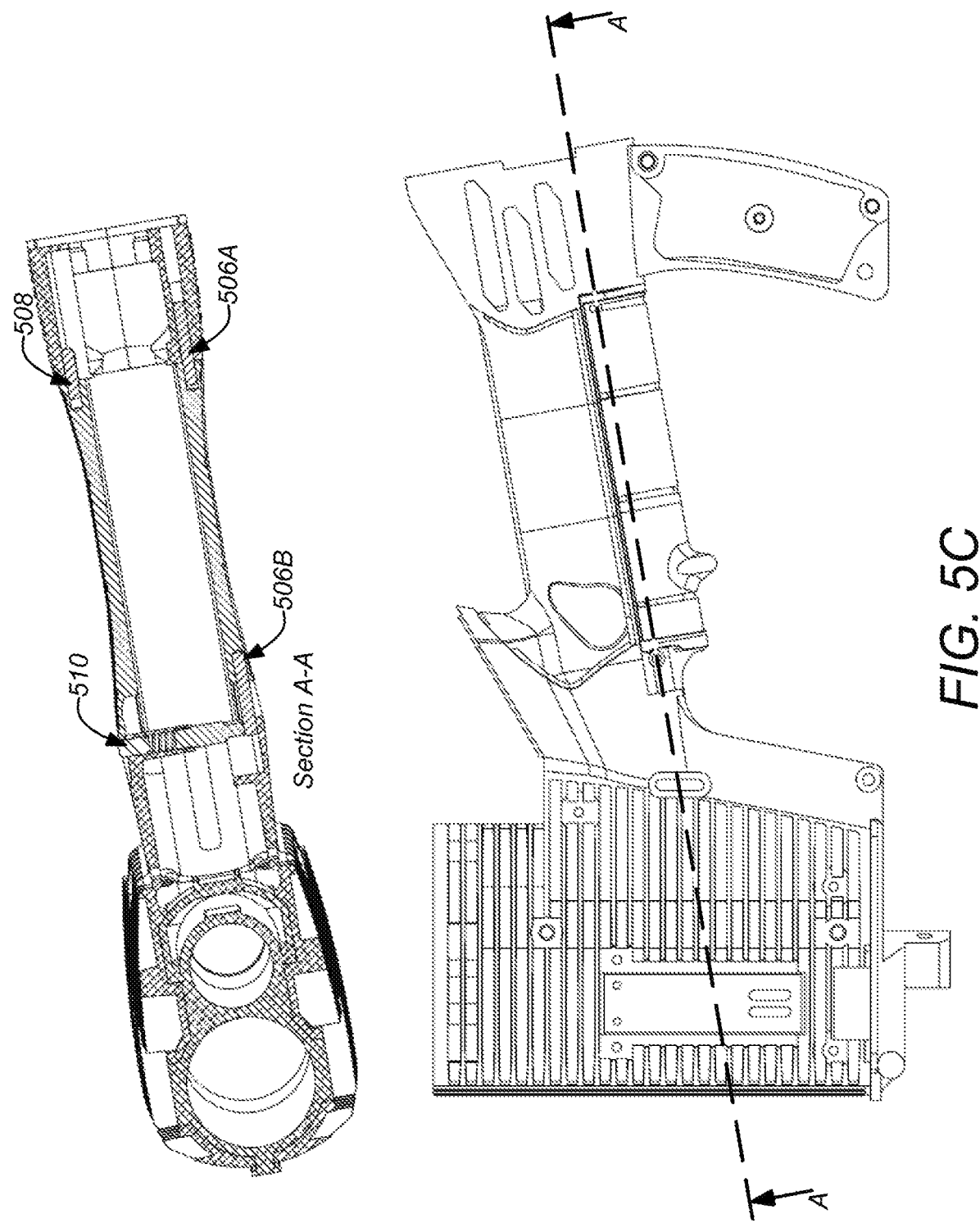

FIGS. 5A-5C illustrate detailed views of the fuel cartridge housing and hand grip assembly of an exemplary combustion driven fastener hand tool embodiment of the invention. The grip portion 104 of the hand tool incorporates the fuel cartridge storage which is accessed by a hinged hand grip cover 502. The hinge 504 can comprise aligned pins 506A, 506B pressed into the hand grip cover 502 along one edge. The hinge 504 is designed to allow some movement along the hinge axis when installed. An aligning pin 508 (which extends from the cover a shorter length than the allowed axial movement of the hinge 504) is disposed on one side of the opposing edge of the hand grip cover 502. In use, the hand grip cover 502 is first closed and then moved along the hinge axis such that the aligning pin 508 engages a hold in the grip portion 104 of the hand tool. When the aligning pin 508 is fully engaged and the hand grip cover 502 is seated against its bottom edge, a spring loaded button catch 210 becomes aligned with an engaging feature in the cover 502 and automatically latches to secure the cover 502 closed. With a fuel cartridge placed into the cover 502, this same process serves to load the cartridge into the hand tool as described hereafter.

When loading a fuel cartridge, with the hand grip cover open, a fuel cartridge is placed in the interior pocket of the hand grip cover (with the port towards the end of the hand grip) and then the hand grip cover is rotated closed about the hinge. Finally, the hand grip cover is moved backward along the hinge axis until the spring loaded button catch engages the cover to secure it in place. This movement of the hand grip cover along the hinge axis also serves to push the fuel cartridge within the grip such that the valved port of the fuel cartridge engages the mating port to the fuel regulator assembly within the grip of the tool. Those skilled in the art will appreciate that this integrated design of the hand grip and fuel storage, loading and unloading mechanism allows for convenient loading and unloading of a fuel cartridge. Notably, there are no separable parts which would need to be temporarily removed when the fuel cartridge is replaced (which could then be lost or broken).

Another significant feature of embodiments of the invention involves a conveniently removable cylindrical subassembly which incorporates a majority of the fuel system components. This cylindrical subassembly is integrated into the hand grip (parallel to the fuel cartridge location) and installed into an extruded subhousing, e.g. from aluminum which includes a bore for the cylindrical subassembly. The cylindrical subassembly includes a venturi or fuel nozzle and a metering valve. These elements can be readily installed or removed for repair or replacement into the bore into the end of the handle. The fuel nozzle has a smaller diameter and is installed in the bore first. The metering valve, having a wider diameter is properly located by a step within the bore. The entire cylindrical subassembly is then held in place by fuel pressure regulator cap subassembly which engages the port of the fuel cartridge (disposed adjacent and parallel to the cylindrical subassembly) and directs the regulated fuel into the metering valve. Finally, a simple rear handle end cap is used to secure all the components (fuel nozzle, metering valve, and fuel pressure regulator) in place. Those skilled in the art will appreciate that the overall design of these components affords ease of maintenance.

Figure 6A:
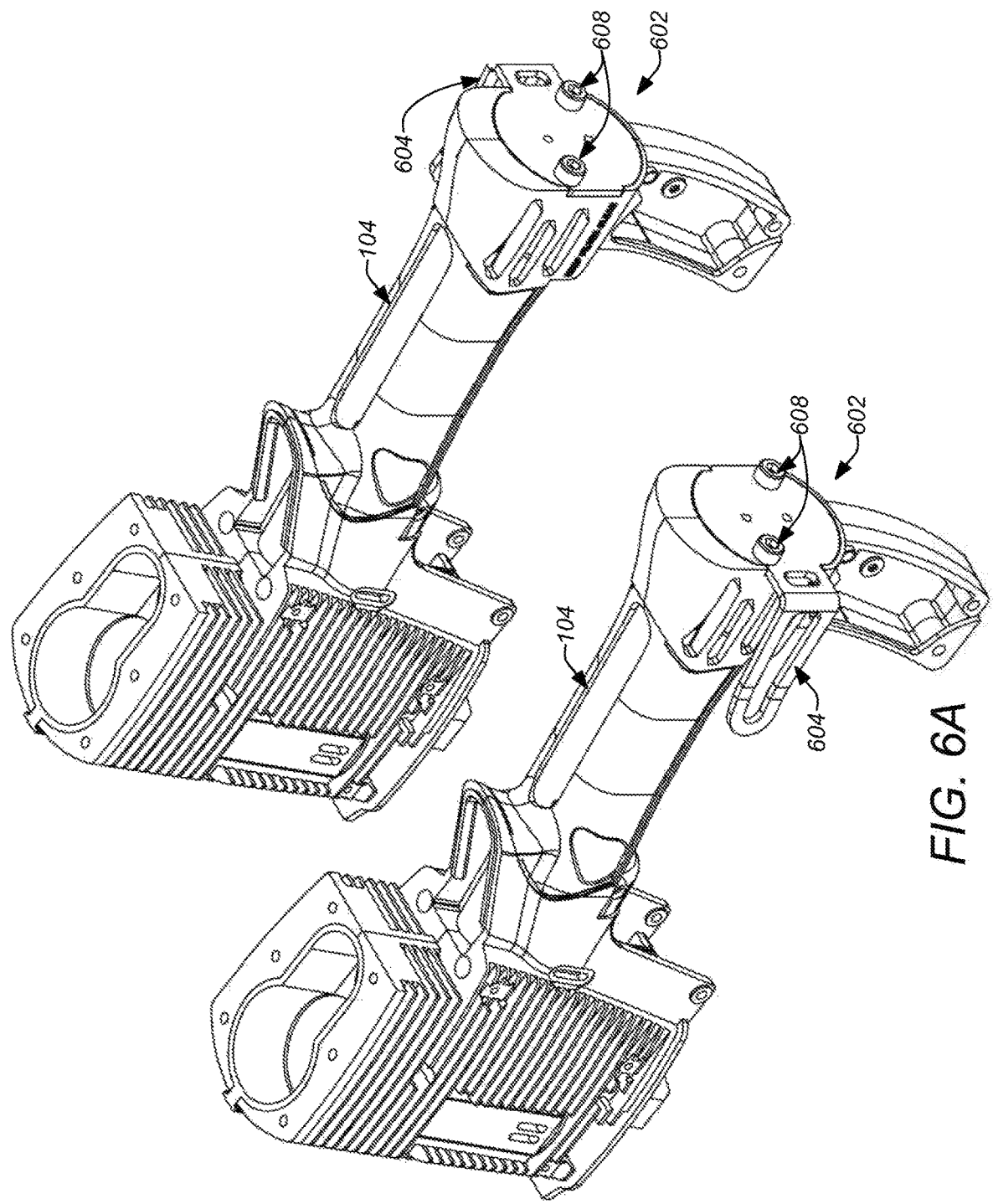
FIG. 6A illustrates a bi-directional belt clip assembly of an exemplary combustion driven fastener hand tool embodiment of the invention.
Figure 6B:
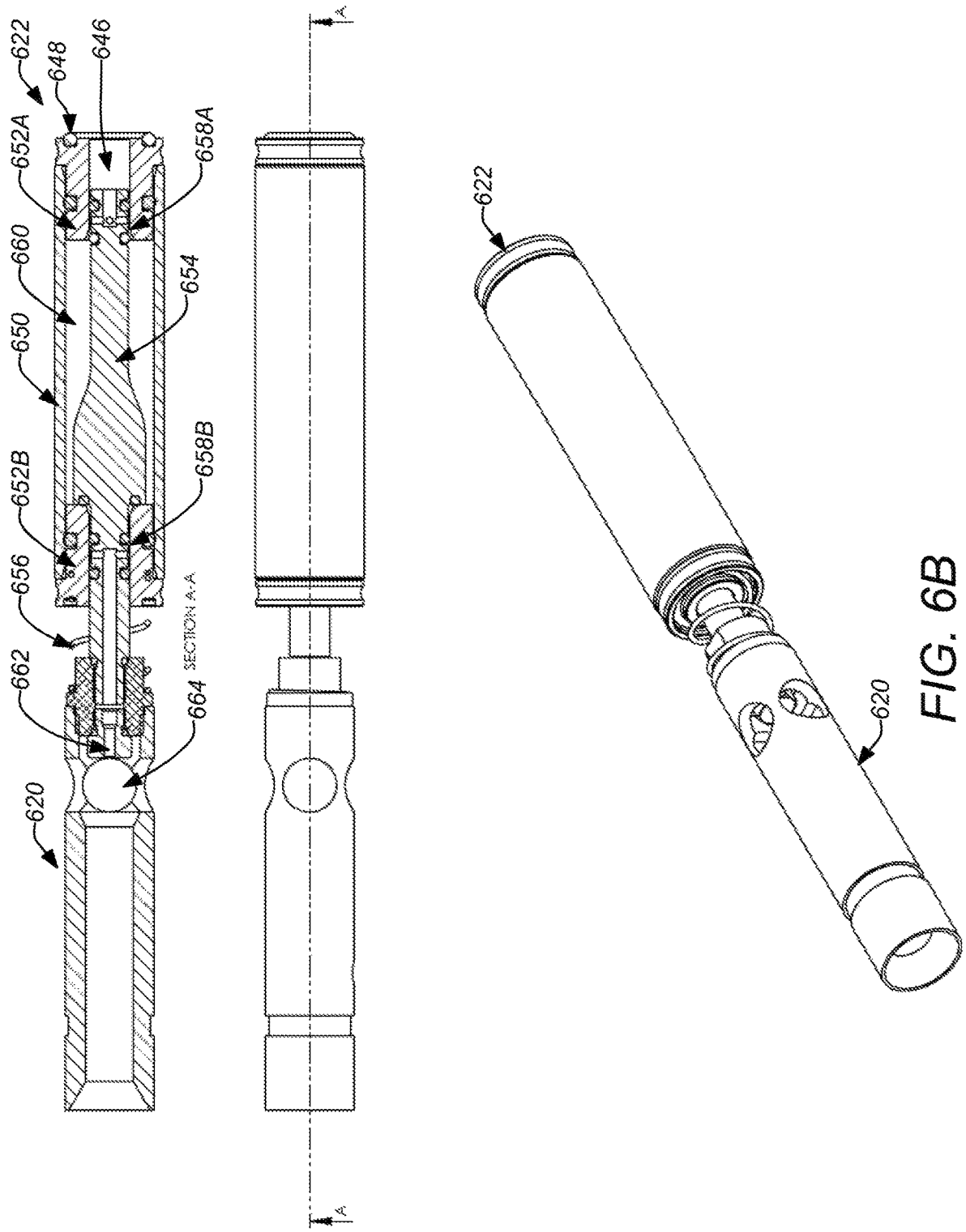
FIGS. 6B-6E illustrate detailed views of a fuel mixing and transport assembly of an exemplary combustion driven fastener hand tool embodiment of the invention.
Figure 6C:
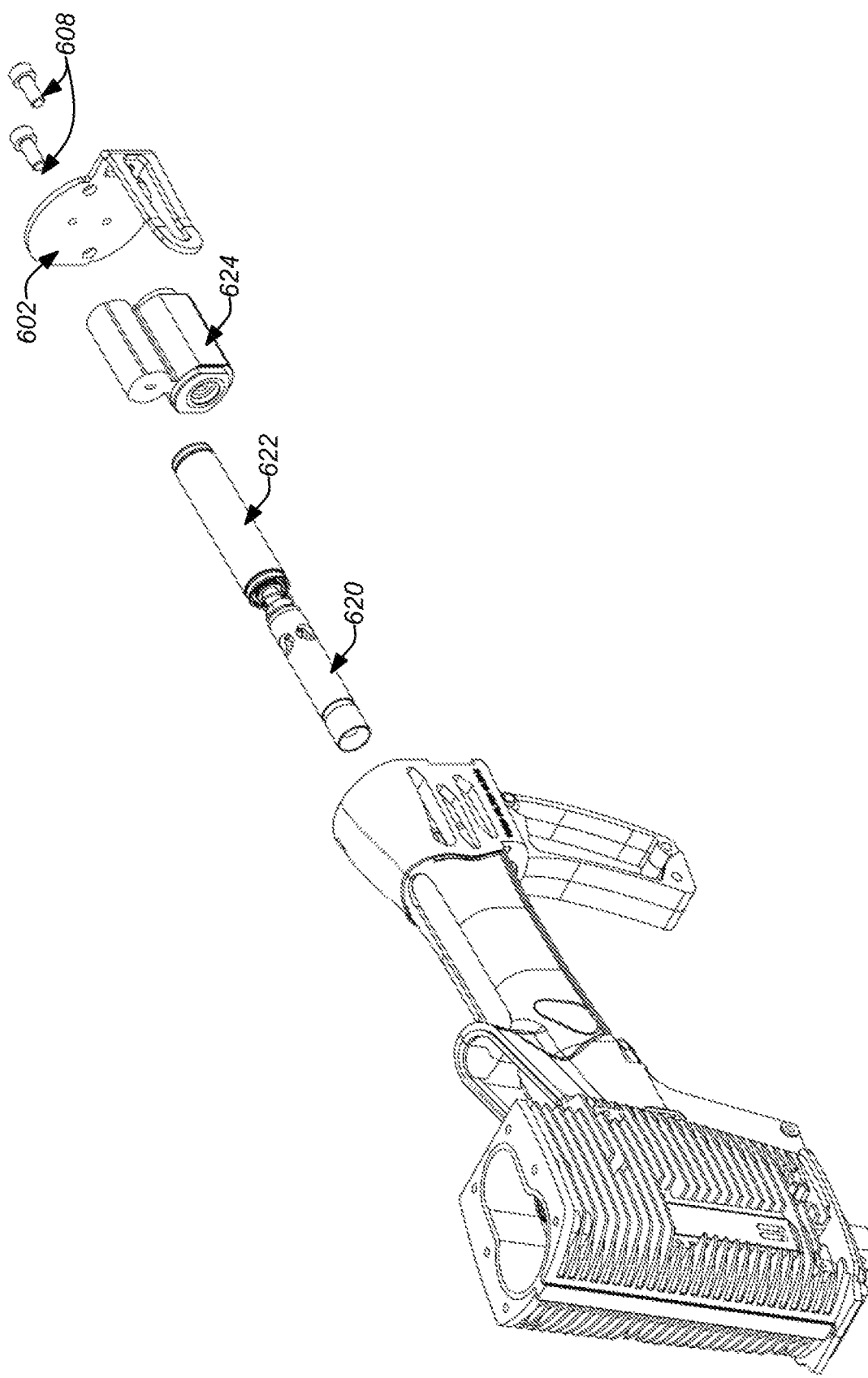

FIG. 6A illustrates a bi-directional belt clip assembly of an exemplary combustion driven fastener hand tool embodiment of the invention. An additional feature is incorporated into the rear handle end cap 602. This hand end cap 602 includes a belt clip 604 extending from one side of the handle which bends to parallel the grip portion 104. The bottom plate 606 of the end cap 602 can be secured by screws 608 in a symmetric pattern such that the same end cap 602 may be installed in two alternate positions. In one position the belt clip extends along the left side of the grip (left image of FIG. 6A) and in the other position the belt clip extends along the right side of the grip (right image of FIG. 6A). This allows a user to select which side he prefers the belt clip to be located.

FIGS. 6B-6E illustrate detailed views of a fuel mixing and transport assembly of an exemplary combustion driven fastener hand tool embodiment of the invention. As previously described, an extruded hand grip section 206 can be employed in the grip portion 104. This hand grip section 206 can be produce having a cylindrical bore which is used to house the fuel components of the hand tool. Three distinct fuel components can be installed in the end of the hand grip into the hand grip section 206. The fuel nozzle 620 and the metering valve 622 fit directly into the cylindrical bore of the hand grip section 206. The larger diameter of the metering valve 622 allows it to be aligned into position against an indexing step cut into the bore of the hand grip section 206. Finally, a pressure regulator 624 is installed over the metering valve 622 and held in place by the end cap 602. The pressure regulator 624 receives the valved port of the adjacent fuel cartridge and directs the pressure-regulated fuel to the metering valve 622.

It should be noted that charging of the combustion chamber with fuel and air is activated by moving the end of the fuel nozzle 620 closest to the front body section backward toward the end of the hand grip by lever 1316 which extends from the fuel nozzle 620 through a wall of the bore of the hand grip section 206. (See FIGS. 7A and 7B.) This is performed through operation of the fuel charging-safety linkage described hereafter in section 10. The design of the fuel nozzle 620 and metering valve 622 within the cylindrical bore enables this action to release the pressurized fuel through the fuel nozzle 620 and entrain air before flowing through the pathway to the combustion chamber. The fuel charging system elements are arranged to provide very reliable operation such that the metering valve 622 closes off the input fuel prior to opening the output end of the fuel nozzle 620. The cylindrical cavity of the hand grip section 206 for the fuel system components also enables inexpensive manufacturing of the cylindrical fuel nozzle 620 and metering valve 622 as these components can be produced using an automated lathe. In addition, these components afford versatility as they have potential to be used in other designs as standard components. Details of the fuel system and its operation delivering fuel from the fuel cartridge to the pathway to the combustion chamber are described hereafter.

Figure 6D:
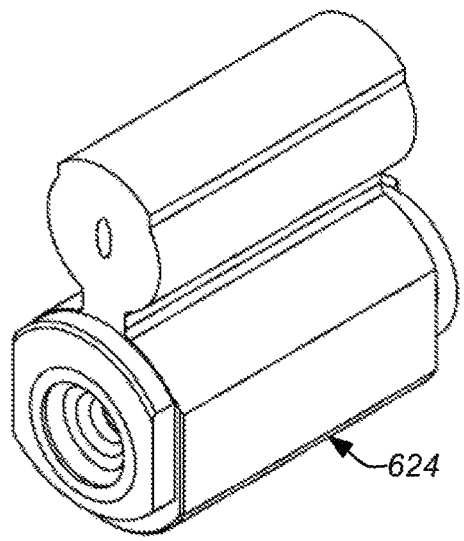
Figure 6D:
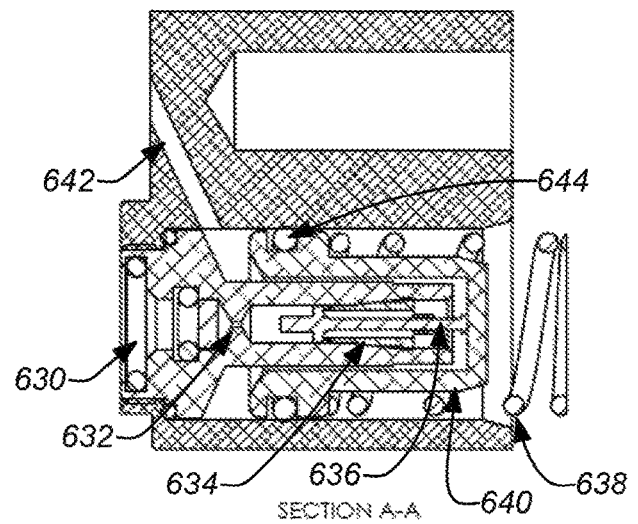
Figure 6D:
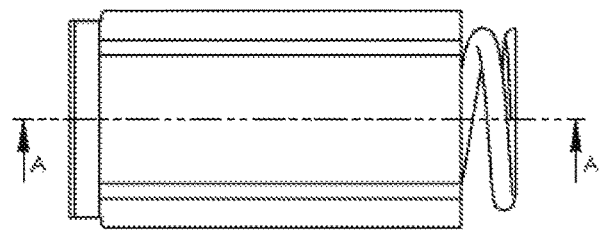
Figure 6D:
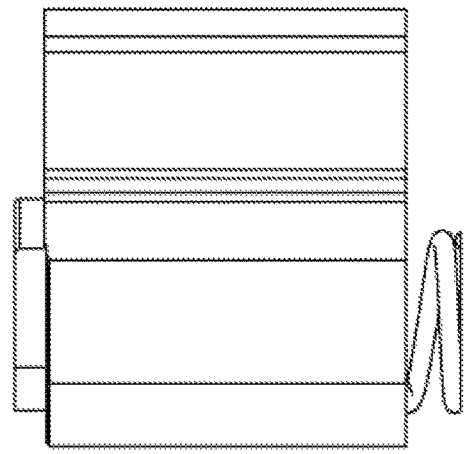

Referring first to FIG. 6D, section A-A, the pressure regulator 624 operates with a port 630 which receives the valved port of the fuel cartridge when it is installed in the grip as previously described. The port 630 and storage location for the fuel cartridge is designed to hold the valved port of the fuel cartridge in an open position so that pressurized liquid fuel is constantly directed into the sealed space of the orifice 632 (using O-ring seals around the valved port of the fuel cartridge). The passage of the small orifice 632 allows fuel to pass through only in a gaseous state. Following the orifice 632, the gaseous fuel is metered through a pressure regulating valve 634. Typically, a known schrader valve, commonly used in bicycle tires and many industrial products to provide a valve for gases, and easily installed into an internally threaded hole. Pressure from the gaseous fuel behind the valve 634 closes it as it pushes the pin 636 forward (to the right). Accordingly, the valve 634 can be opened by pushing the pin 636 backward (to the left). The valve 634 operates to release the gaseous fuel a specified pressure based on the amount of force applied to the pin 636 against the gas pressure. The force on the pin 636 is provided by a biasing spring 638 which pushes against a cylindrical cap 640 that in turn pushes the end of the pin 636. The gaseous fuel is only allowed to pass through the valve 634 at a pressure determined by the force of the appropriately designed spring 638 and into the annular space surrounding the valve 634. An o-ring seal 644 in a outer diameter groove of the cap 640 isolates the gaseous fuel. In use, the spring 638 is under compression between the cap 640 and the installed end cap 602. See e.g. FIG. 6A. The pressure-regulated gaseous fuel is allowed through a passage 642 to the metering valve 622.

Referring back to FIG. 6B, section A-A, the metering valve 622 receives the pressure-regulated gaseous fuel at the sealed port 646. The port 646 has a face o-ring seal 648 against the body of the pressure regulator 624. As previously mentioned, the metering valve 622 and the fuel nozzle 624 operate together in a cylindrical space within the hand grip. The metering valve 622 essentially comprises a cylindrical housing 650 with a cap 652A, 652B at each end and a central dual valve stem 654. The novel design employs a common cap 652A, 652B that can be used at either end of the housing 650. On the inlet side, a groove in the cap 652a is used for the O-ring seal 648. On the outlet side, however, the same groove in the cap 652B is used as a seat for the biasing spring 656 against the fuel nozzle 620. Use of a common part for the caps 652A, 652B reduces the overall manufacturing costs.

Metering of a fuel charge for combustion is accomplished by movement of the dual valve stem 654. The dual valve stem 654 is shown in section A-A of FIG. 6B with the inlet valve 658A (on the right side) open and the outlet valve 658B (on the left side) closed. The valves 658A, 658B are very similar in design but operate in opposite directions; Fuel flows in a central channel of the inlet valve 658A and then through one or more radial pathways into a small annular space between two a-ring seals. When the dual valve stem 654 is pushed fully left (by fuel pressure against the right end of the stem 654), a wide step of the stem 654 on the left side stops against the inner end of the cap 652B and the inlet valve 658A is open. The open position of the inlet valve 658A allows just enough clearance between the inner O-ring of the two o-ring seals and a chamfered internal diameter of the cap 658A for the fuel to flow freely into the metering volume 660 (the annular space between the stem 654 and the inner wall of the cylindrical housing 650). When the safety linkage is operated (as described hereafter), the fuel nozzle 620 is pushed to the right (overcoming the combined resistive forces of the biasing spring 656 and the fuel pressure against the right end of the dual valve stem 654) to move the dual valve stem 654 to the right. Precise spacing of the inlet and outlet valves 658A, 658B and the length of the stein 654 allows movement of the dual valve stem 654 to the cause the inlet valve 658A to close and the then the outlet valve 658B to open in a very precise sequence. The inlet valve 658A is closed as the inner O-ring of the two O-ring seals bounding the radial pathway(s) (on the right side of the stem 654) recedes into the chamfered internal diameter of the cap 658A and just before the outlet valve 658B is moved enough to create clearance between the inner O-ring of the two O-ring seals (on the left side of the stem 654) and a chamfered internal diameter of the cap 658B for the fuel to flow freely past the o-ring and into the one or more radial pathways of the stem 654 leading to the central channel on the left end of the dual valve stem 654. In this manner, only the amount of fuel which is temporarily isolated within the metering volume 660 is allowed to proceed out the left central channel of the dual valve stem 654 to the fuel nozzle 620.

The gaseous fuel charge from the central channel of the dual valve stem 654 of the metering valve 622 is directed into a sealed channel to an orifice 662 at the right end of the fuel nozzle 620. Past the orifice 662, the gaseous fuel enters a venturi region 664 where the fuel becomes entrained with air. From there, the fuel and air mixture moves through a wider central channel of the fuel nozzle 620 and out the end to the left to enter the pathway, past the baffle (described hereafter), and into the combustion chamber of the front end section previously described.

Figure 6E:
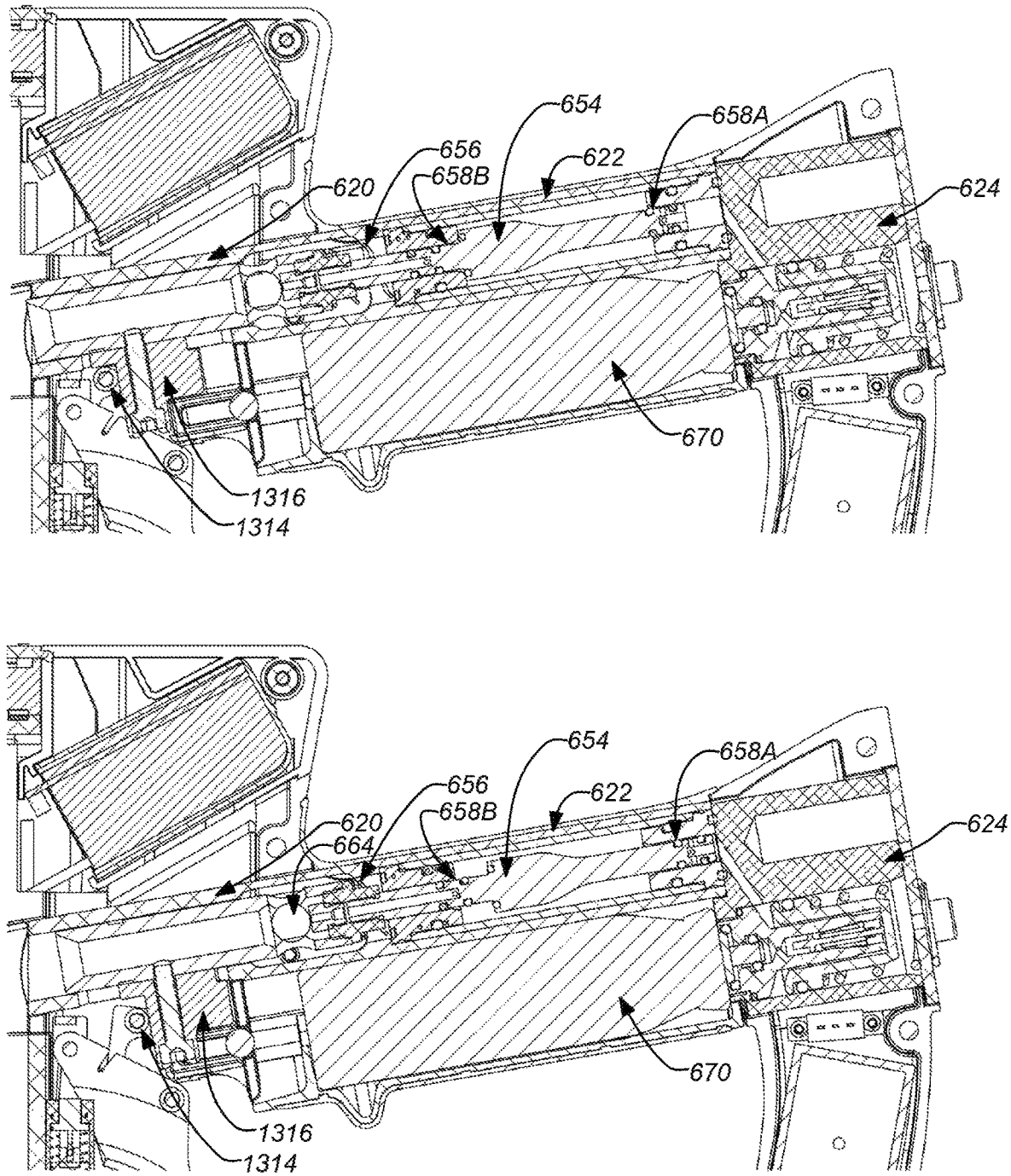

FIG. 6E shows the fuel nozzle 620 and metering valve 622 before and after charging the combustion chamber with the fuel and air mixture. The top panel shows the system before charging with the fuel nozzle 620 and the dual valve stem 654 of the metering valve 622 pushed to the left (toward front body section). As discussed above, in this position the inlet valve 658A is open so that fuel flows from fuel cartridge 670 through the pressure regulator 624 and into the metering volume 660 of the metering valve 622. The bottom panel shows the system after charging. The safety linkage (described hereafter) has been actuated to push the roller bushing 1314 to the right against a lever 1316 affixed to the fuel nozzle 620 (through a wall of the hand grip section 206). The body of the fuel nozzle 620 moves to the right compressing the biasing spring 656 and moving the dual valve stem 654 of the metering valve 622 to the right. Movement of the dual valve stem 654 to the right causes the inlet valve to close and then the outlet valve to open as described above allowing gaseous fuel from the metering volume 660 to flow out through the venturi of the fuel nozzle 620 and become entrained with air and flow on through the pathway to the combustion chamber.

It should also be noted that the requirements for sealing the fuel system vary along the fuel and fuel and air mixture path. For example, the fuel path beginning from the fuel cartridge port to the pressure regulator and through the metering valve and fuel nozzle must have good seals to prevent leakage of the fuel in more liquid form. However, the fuel and air mixture path following the fuel nozzle and up to the combustion chamber does not require good seals; the air and fuel mixture will not leak through ordinary joint contacts in most cases. The combustion and piston chambers, however, again need good seals in order to efficiently contain and direct the pressure from combustion to the piston. Those skilled in the art will appreciate the different requirements for seals for each portion of the fuel system as described here and select suitable solutions without undue experimentation.

4. Igniter for Combustion Driven Fastener Hand Tool

Another feature that embodiments of the invention can incorporate involves the fuel ignition system. Embodiments of the invention can employ a single unit igniter component which incorporates both an electrical ignition switch and a spark point. The single unit igniter can be configured having an elongated main section with the electrical ignition switch at one end. The spark point is disposed in the end of a secondary section that extends laterally from the main section. Electrical connections to both the spark point and the electrical ignition switch are coupled to the ignition control electronics module disposed elsewhere within the hand tool. The electrical ignition switch may be an optical switch for improve reliability. The spark point can comprise an exposed conductive end, e.g. metal, within a cylindrical insulator. In operation, when the electrical ignition switch is closed, sensed by the ignition control electronics module, the ignition control electronics module then sends a high voltage pulse to the spark point.

Figure 7B:
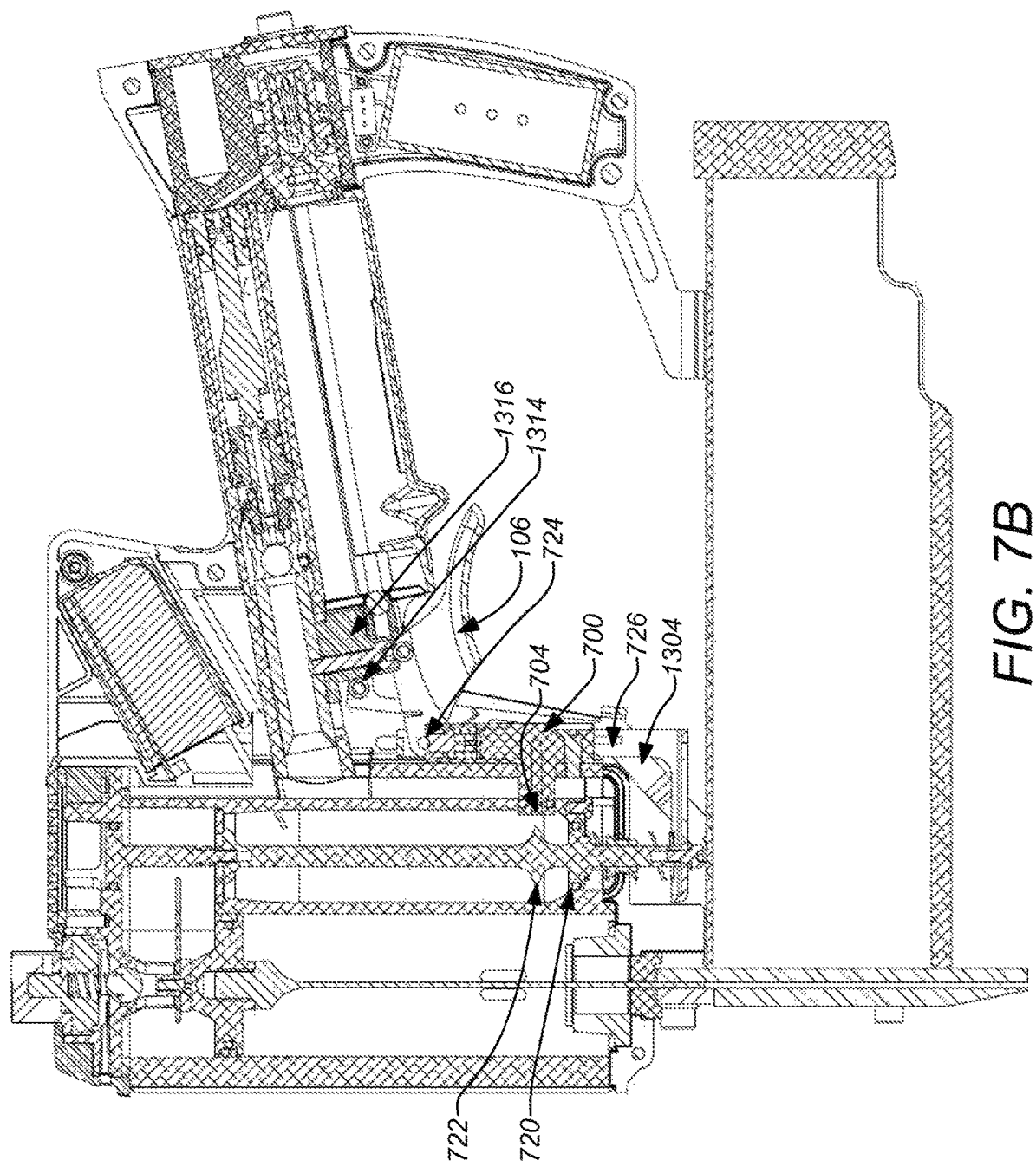
Figure 7C:
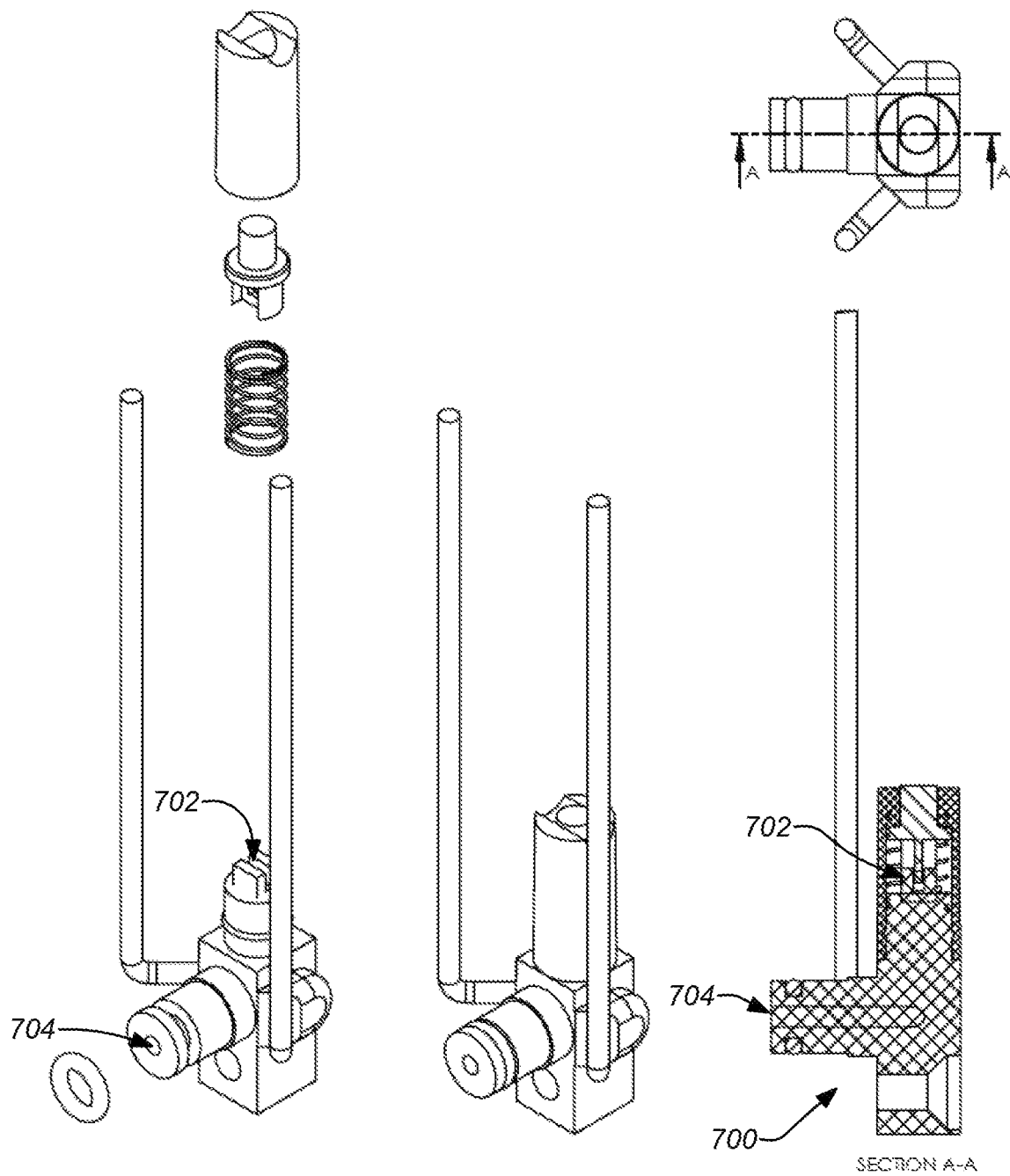
FIG. 7C illustrates an integrated ignition switch and spark point of an exemplary combustion driven fastener hand tool embodiment of the invention.

FIG. 7C illustrates an integrated ignition switch and spark point of an exemplary combustion driven fastener hand tool embodiment of the invention. The igniter component 700 comprises both an ignition switch 702 and an ignition spark point 704 in a single housing as described above.

Embodiments of the invention can also employ a disc built into a valve stem within the combustion chamber to aid control of the spark used for ignition of the fuel and air mixture. There are a number of advantages derived from the use of this disk. In general, the valve to the combustion chamber opens to allow the fuel and air mixture to enter the combustion and is then closed prior to ignition of the fuel and air in the combustion chamber. The basic valve design comprises a cylindrical element having an O-ring seal. Smaller diameter stems extend from this cylindrical element in both directions and are used to support and manipulate the valve. In addition, the valve is also conductive and used to close the sparking circuit; a spark is generated between the spark point (of the igniter component) and the disc on the valve stem to ignite the fuel and air mixture within the combustion chamber.

Employing the disk on the valve stem allows the spark point on the igniter component to be disposed closer to the wall of the combustion chamber. Thus, the spark point of the igniter component does not extend into the interior of the combustion chamber and can be shortened to be virtually flush with the combustion chamber wall. Accordingly, the spark point of the igniter component does not obstruct removal or installation of the valve or other components within the combustion chamber. In addition, position of the disc on the stem sets the spark location close to the end of the combustion chamber. Accordingly, combustion efficiency is improved because the flame front during combustion moves substantially in one direction away from the spark and toward the piston cylinder. In contrast, if the spark were generated in the middle of the combustion chamber a pair of flame fronts would move in opposite directions with only one moving toward the piston chamber, greatly reducing the combustion efficiency.

FIGS. 7A and 7B illustrate cutaway views of a fuel charging operation of an exemplary combustion driven fastener hand tool embodiment of the invention. FIG. 7A shows the combustion chamber valve 720 in the open position with the valve stem disc 722 for spark generation. Note the valve stem disc is disposed above the spark point 704 of the igniter component 700. FIG. 7B shows the combustion chamber valve 720 in the closed position with the valve stem disc 722 for spark generation. The chamber valve 720 is closed by the user pulling the trigger 106 toward the hand grip. The trigger 106 has a pinned joint 724 at a front end coupled to a sliding link 726 which is coupled to the chamber valve 720. Here the valve stein disc is disposed in line with the spark point 704 of the igniter component 700 providing the closest separation for spark generation.

5. Replaceable Piston Driver for Combustion Driven Fastener Hand Tool

Another feature of embodiments of the invention enables convenient replacement of the primary wearable component of the hand tool. The dual chambers (which are formed by the bores of the front body section previously described) are easily accessible for service and replacement of components. The piston driver of the combustion driven fastener hand tool typically is the primary wearable component due to its repeated striking of the fasteners. Accordingly, it is expected that the piston driver will be replaced more frequently than other components. Thus, the hand tool design incorporates features which allow very convenient replacement of piston driver. A top cap assembly of the front body section is designed such that it can be removed in one piece after removing a set of fasteners, e.g. six screws. Removal of the top cap assembly provides direct access to the piston driver so that it can be easily replaced. Access to both the piston and combustion chambers is provided.

Figure 8:
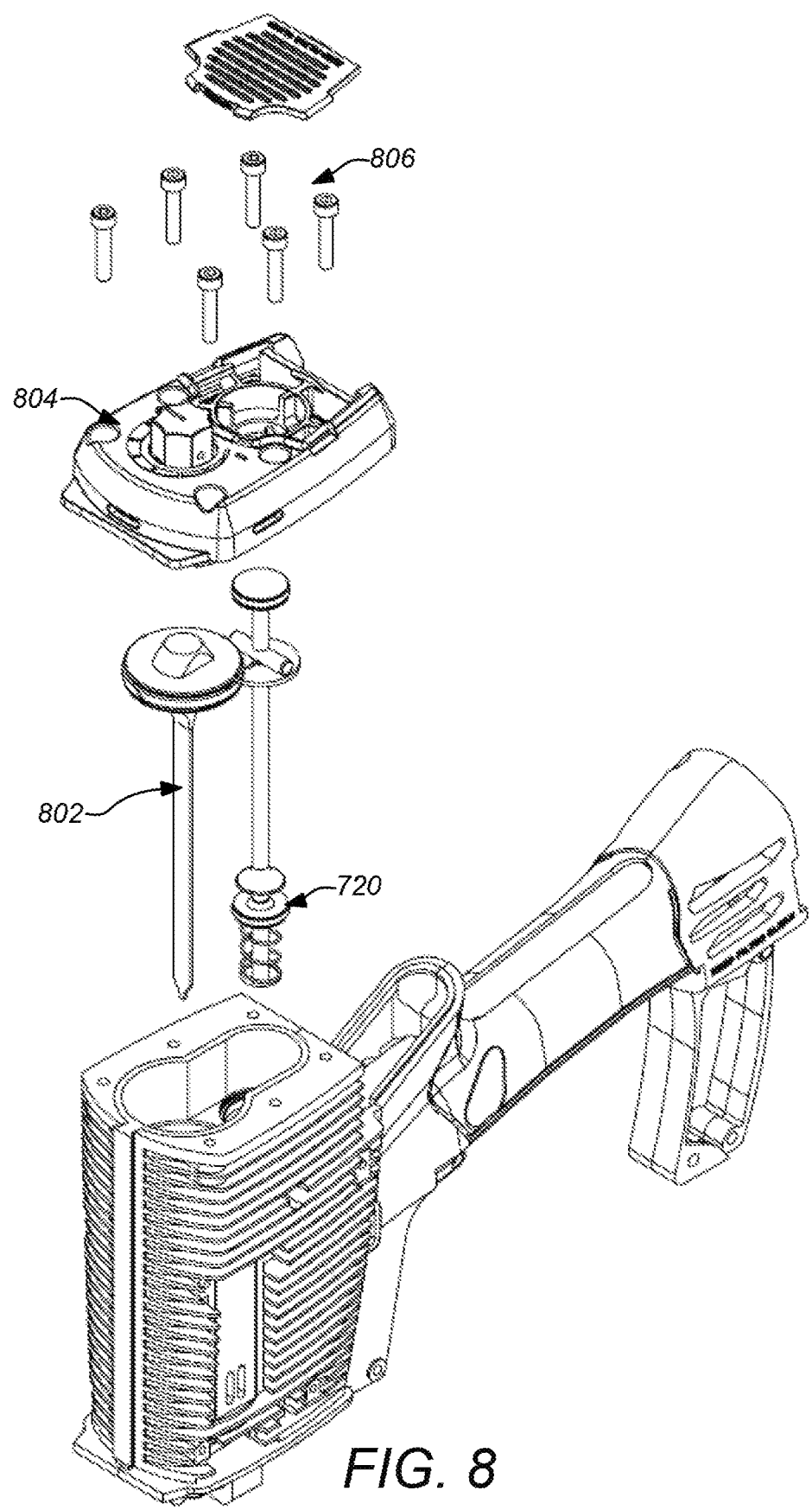
FIG. 8 illustrates a dual chamber assembly of an exemplary combustion driven fastener hand tool embodiment of the invention.

FIG. 8 illustrates a dual chamber assembly of an exemplary combustion driven fastener hand tool embodiment of the invention. The exploded view shows the parts as they will be installed. The piston driver 802 which may need occasional replacement is installed directly into the first chamber and the valve 720 and stem assembly is installed directly into the second chamber Both chambers are closed and sealed together by installation of the top cap assembly 804 which is held in by a set of identical fasteners 806, e.g. screws.

6. Unitary Fuel Passage Baffle for Combustion Driven Fastener Hand Tool

Embodiments of the invention can also employ an\ novel air and fuel mixing baffle within the pathway between the fuel nozzle and the combustion chamber. The mixing baffle creates turbulent flow of the air and fuel enabling improved mixing as the fluid moves through the pathway and into the combustion chamber. The design of the mixing baffle takes advantage of a turn in the pathway. Accordingly, the mixing baffle comprises a flat plate of material, e.g. metal, having a plurality of cuts on one side to yield a plurality of separate flaps. Alternate flaps are bent to partially obstruct the pathway on one side the turn, whereas unbent flaps partially obstruct the pathway on the other side of the turn. The simple design enables a mixing baffle to be very cheaply manufactured. In addition, tuning of the design is similarly made very convenient as the mixing baffle can be quickly altered in development.

Figure 9A:
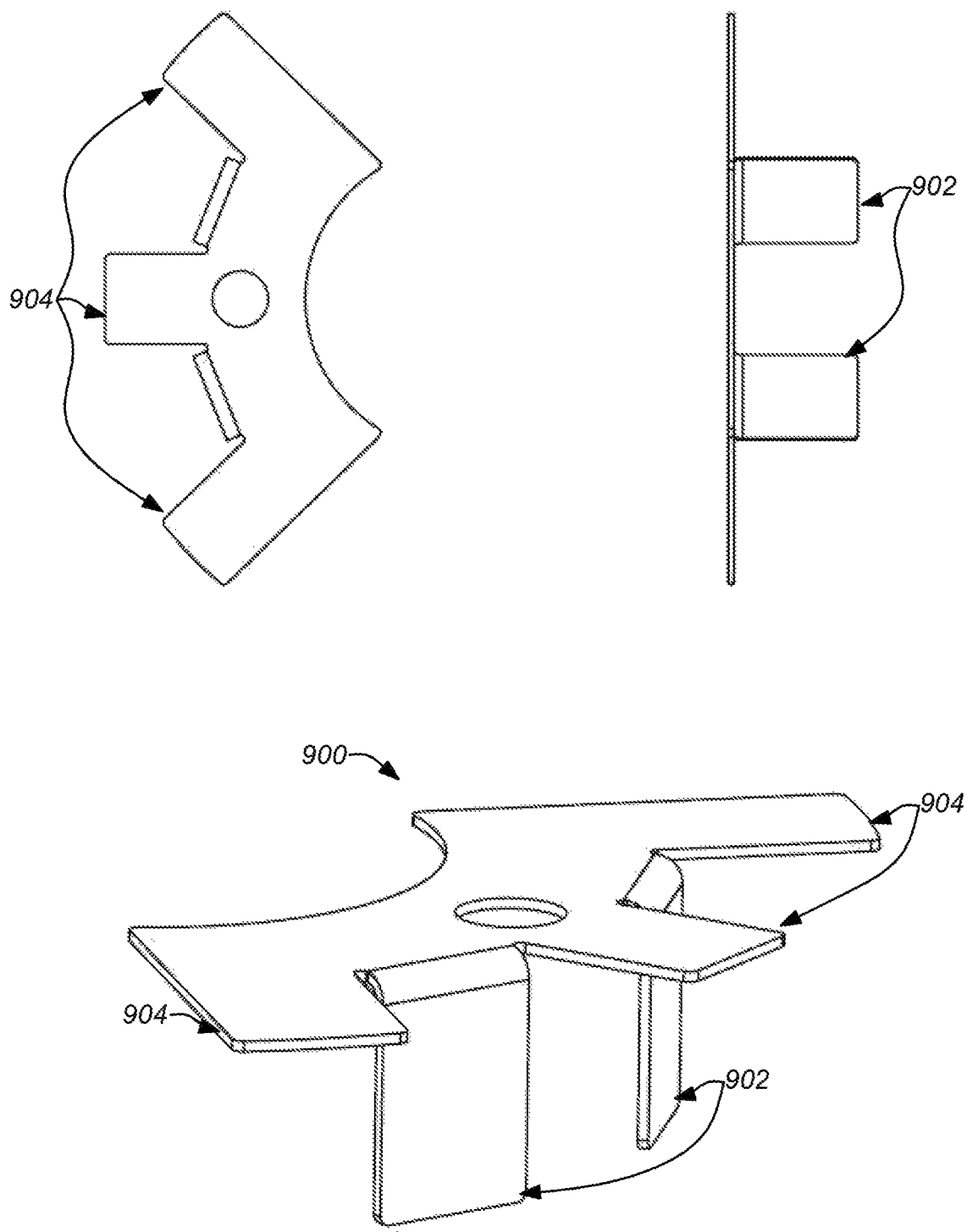
FIGS. 9A-9C illustrates a unitary fuel passage baffle of an exemplary combustion driven fastener hand tool embodiment of the invention.
Figure 9B:
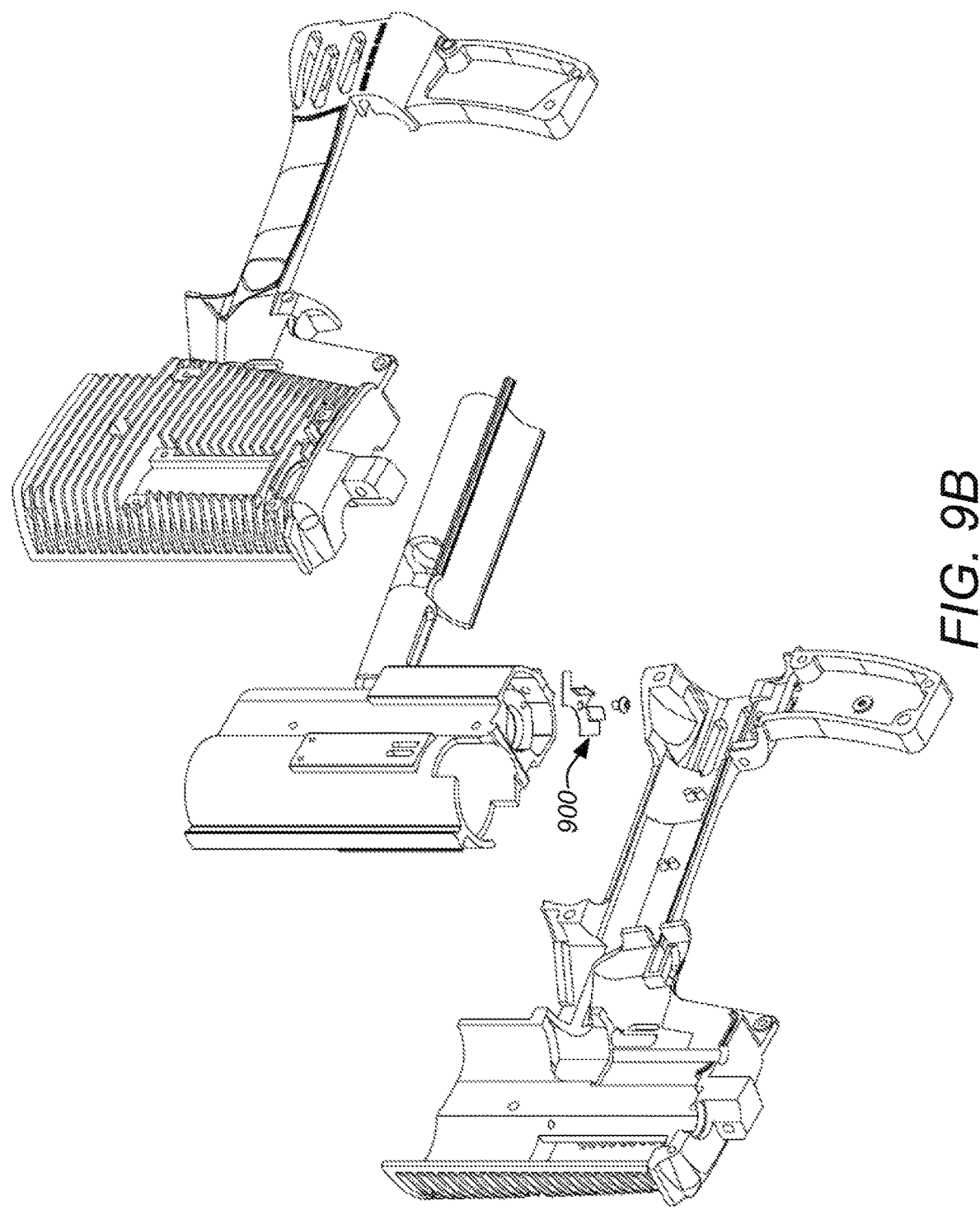
Figure 9C:
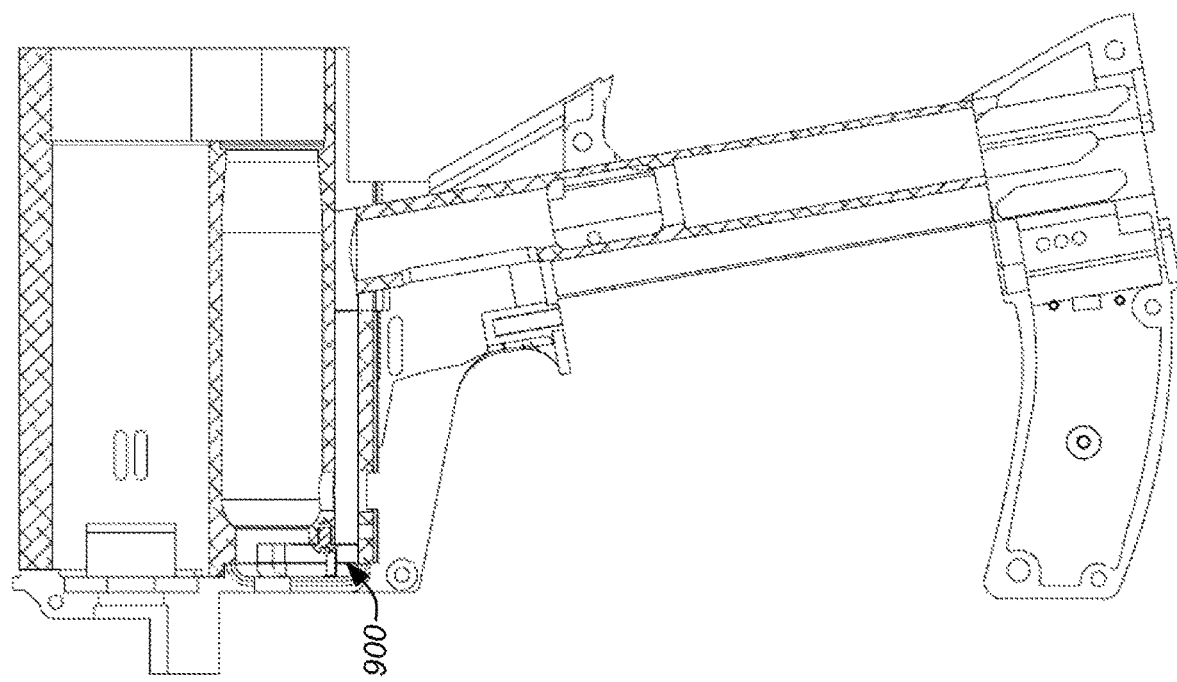
Figure 9C:
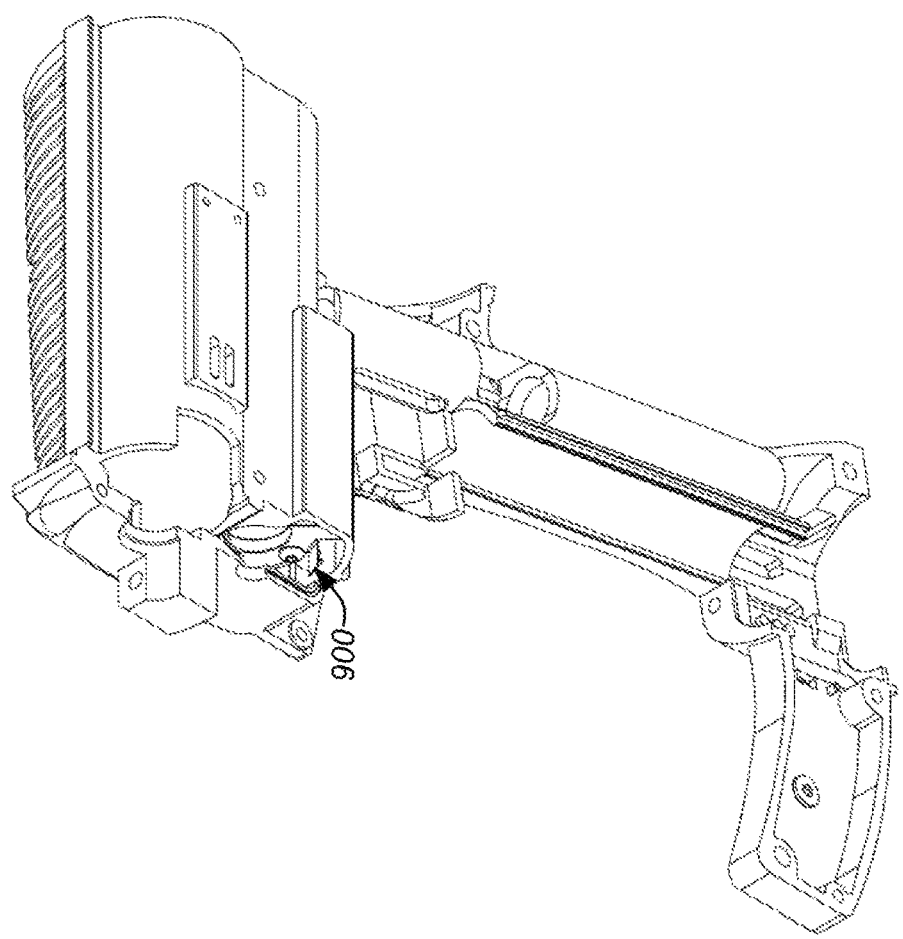

FIGS. 9A-9C illustrates a unitary fuel passage baffle 900 of an exemplary combustion driven fastener hand tool embodiment of the invention. It will apparent to those skilled in the art that the baffle 900 can be readily constructed from flat sheet material, e.g. metal, having slots cut to form a plurality of flaps. In the example embodiment, five flaps 902, 904 are shown although any number of flaps may be employed for a specific design. Alternating flaps 902 are bent such that when the baffle 900 is installed in a pathway turn one set of flaps 904 partially obstruct the pathway on one side of the turn and the other set of flaps 902 partially obstruct the pathway on the other side of the turn. FIGS. 9B and 9C show the installation location of the example embodiment where the set of three flaps 904 partially obstructs the fuel and air mixture pathway as it moves down the pathway and the remaining set of two flaps 902 partially obstructs the pathway after it turns to enter the primary combustion chamber.

7. Ignition Battery Compartment for Combustion Driven Fastener Hand Tool

Embodiments of the invention can also employ a novel battery storage. The hand tool can employ an electronic combustion ignition system which employs nominal battery power. As previously described, the battery carrier section can be located at the end of the the hand grip. The battery carrier section extends from the end of the grip portion towards the end of the fastener strip carrier. In this manner, the battery carrier section also provides additional structural support for the fastener strip carrier. In addition, the battery carrier section can employ a sliding cover, which can be pinned to rotate about one point, e.g. with a first screw, and secured at another point, e.g. with a second screw. A power switch for the hand tool ignition system can also be disposed on the side opposite the cover.

Figure 1E:
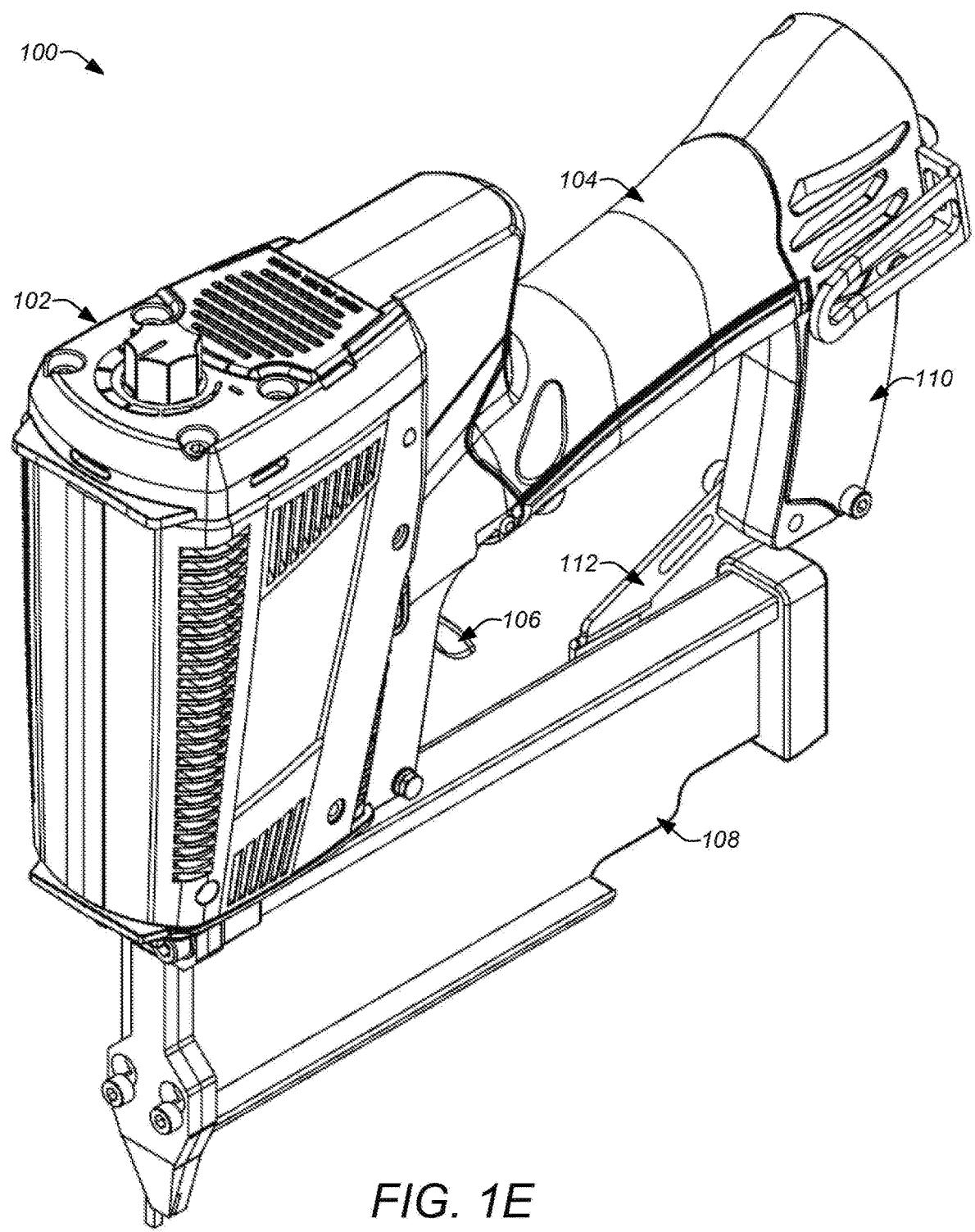
Figure 2A:
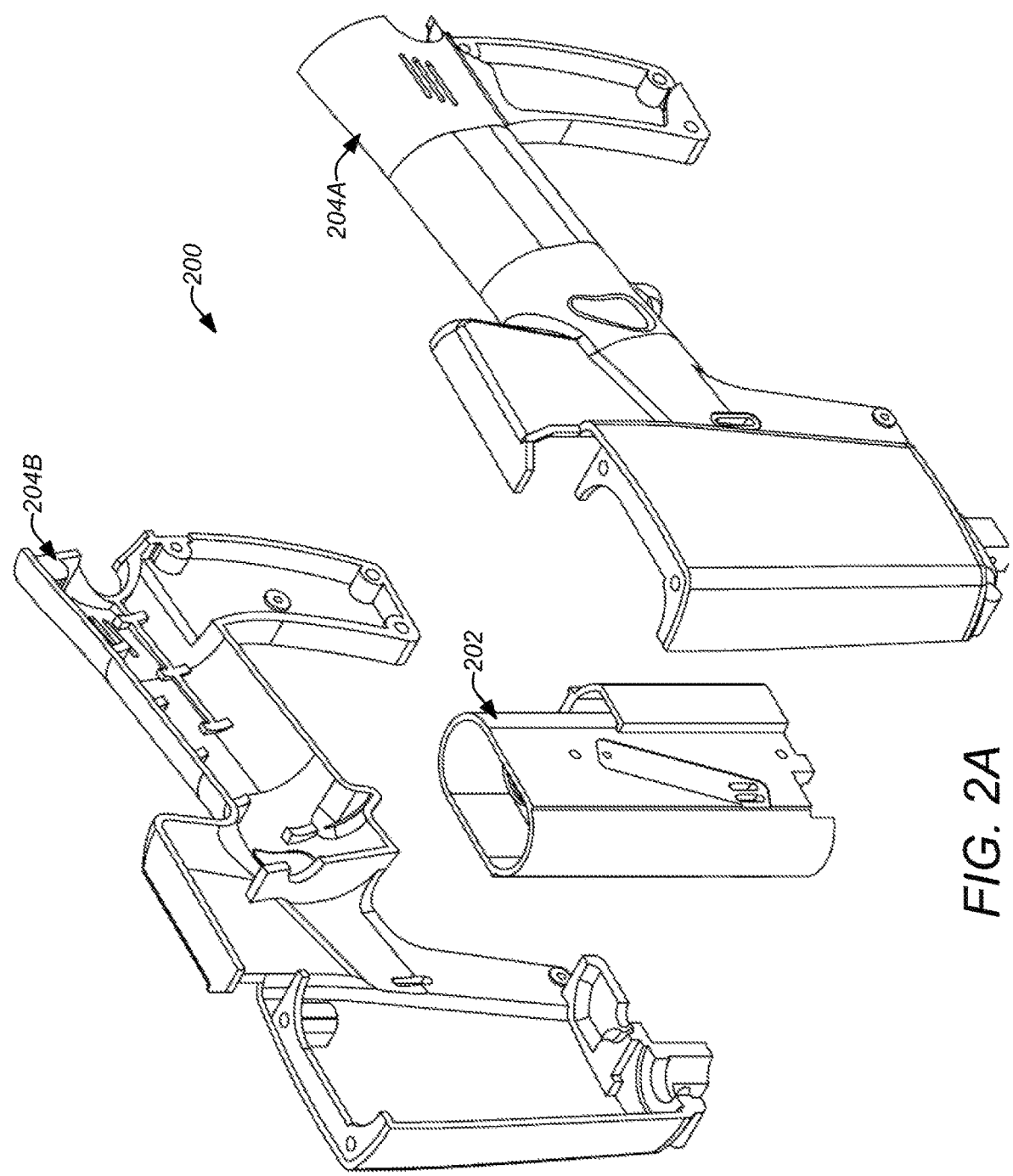
Figure 2B:
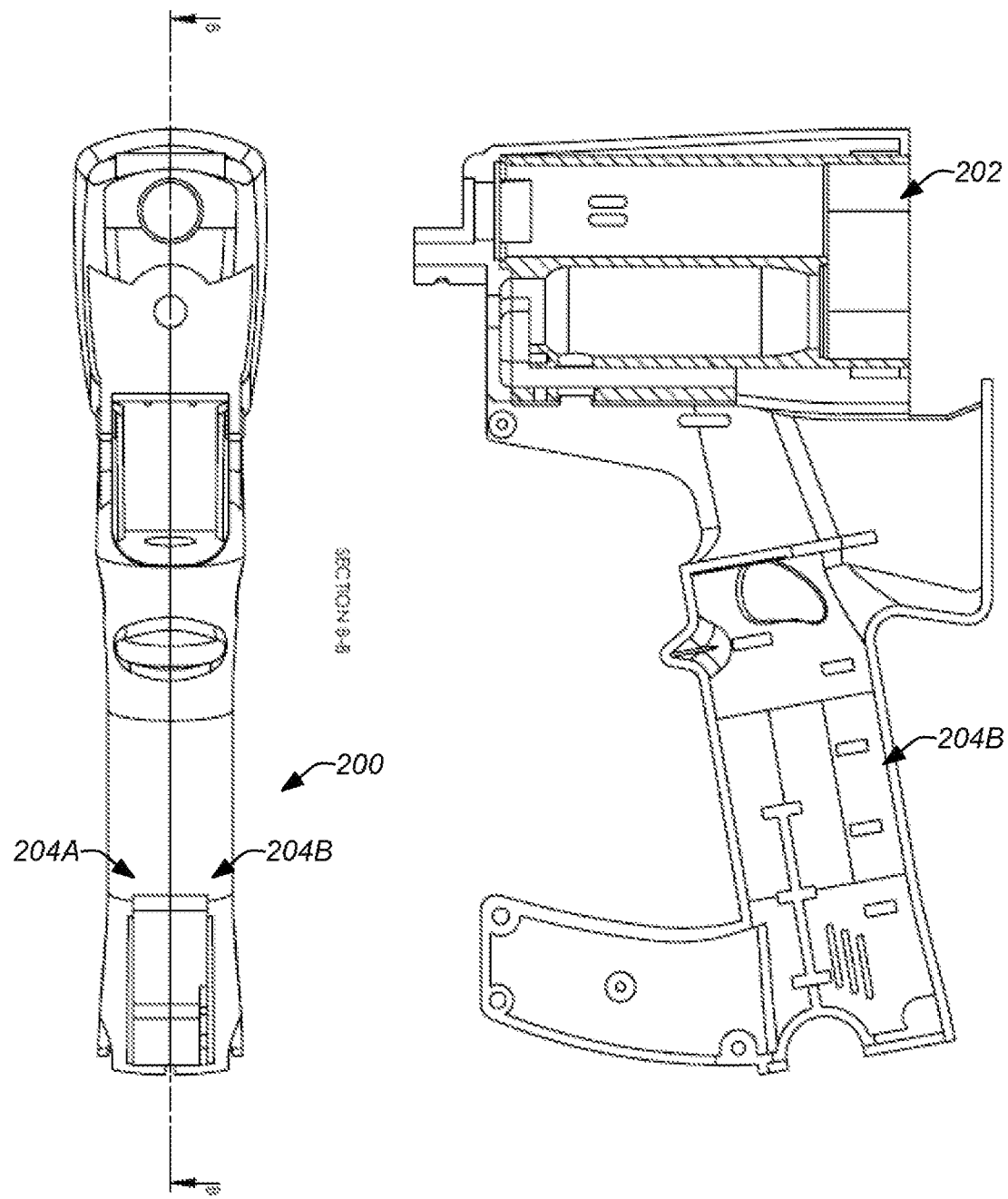
Figure 2C:
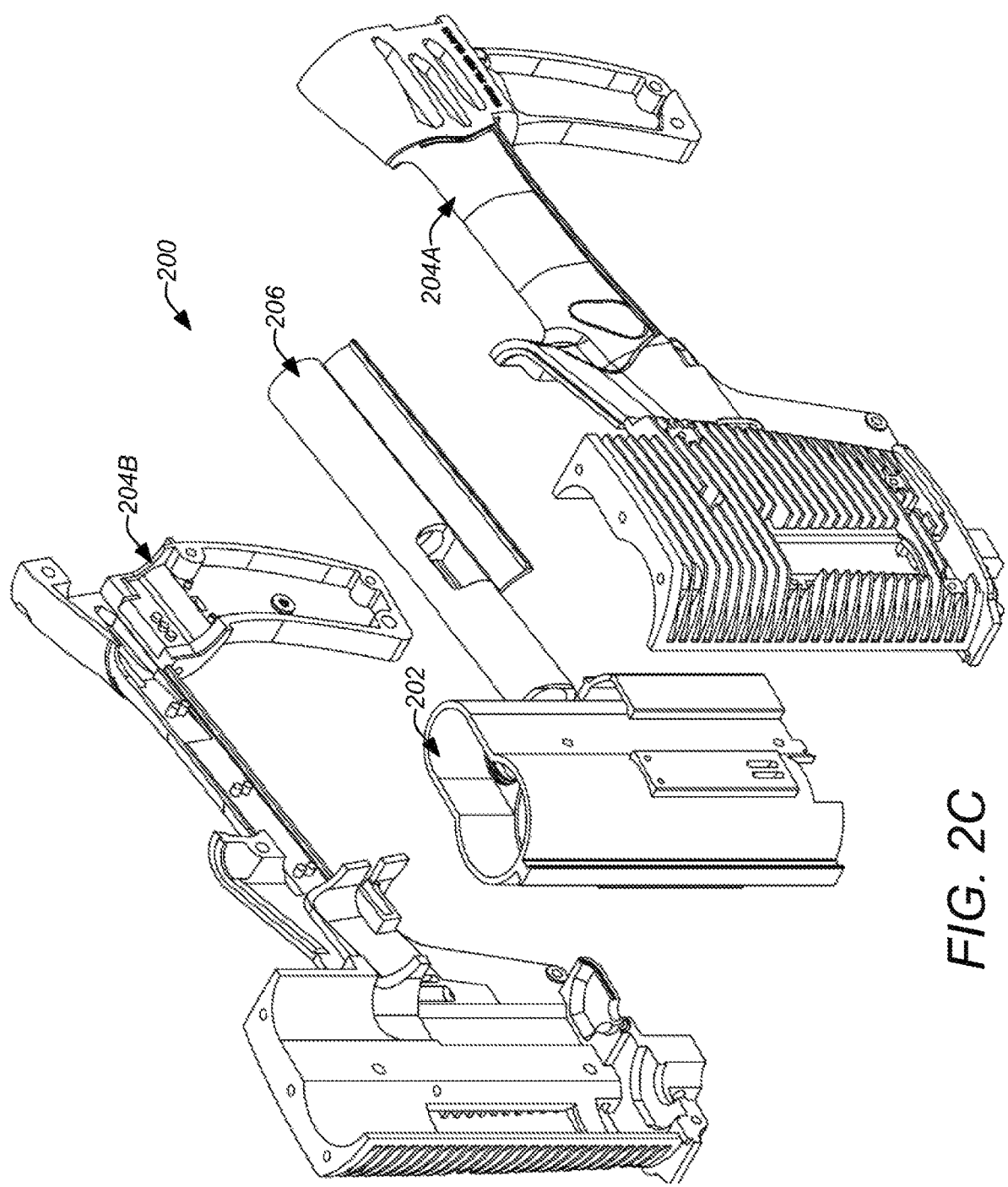
Figure 2D:
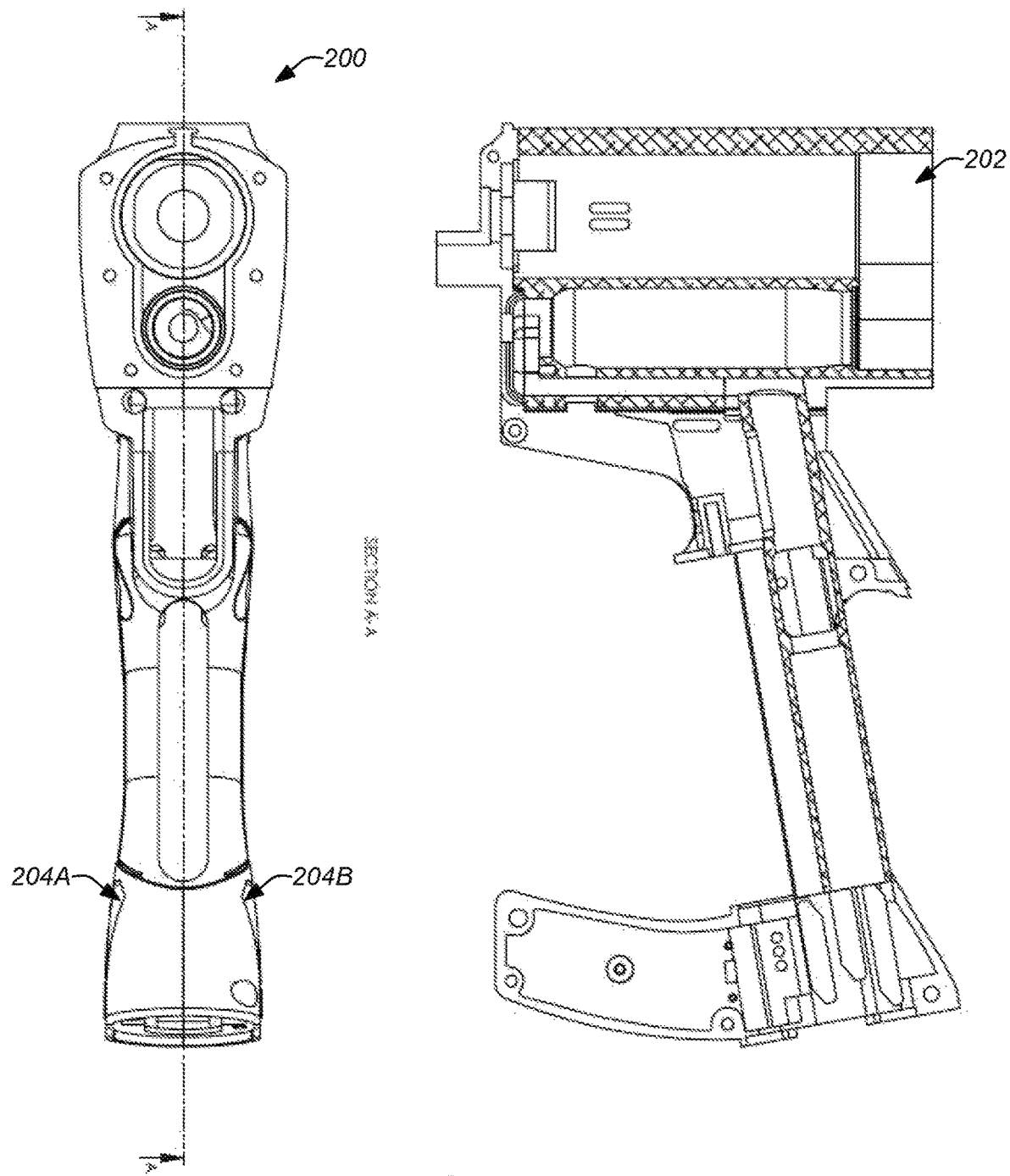
Figure 10:
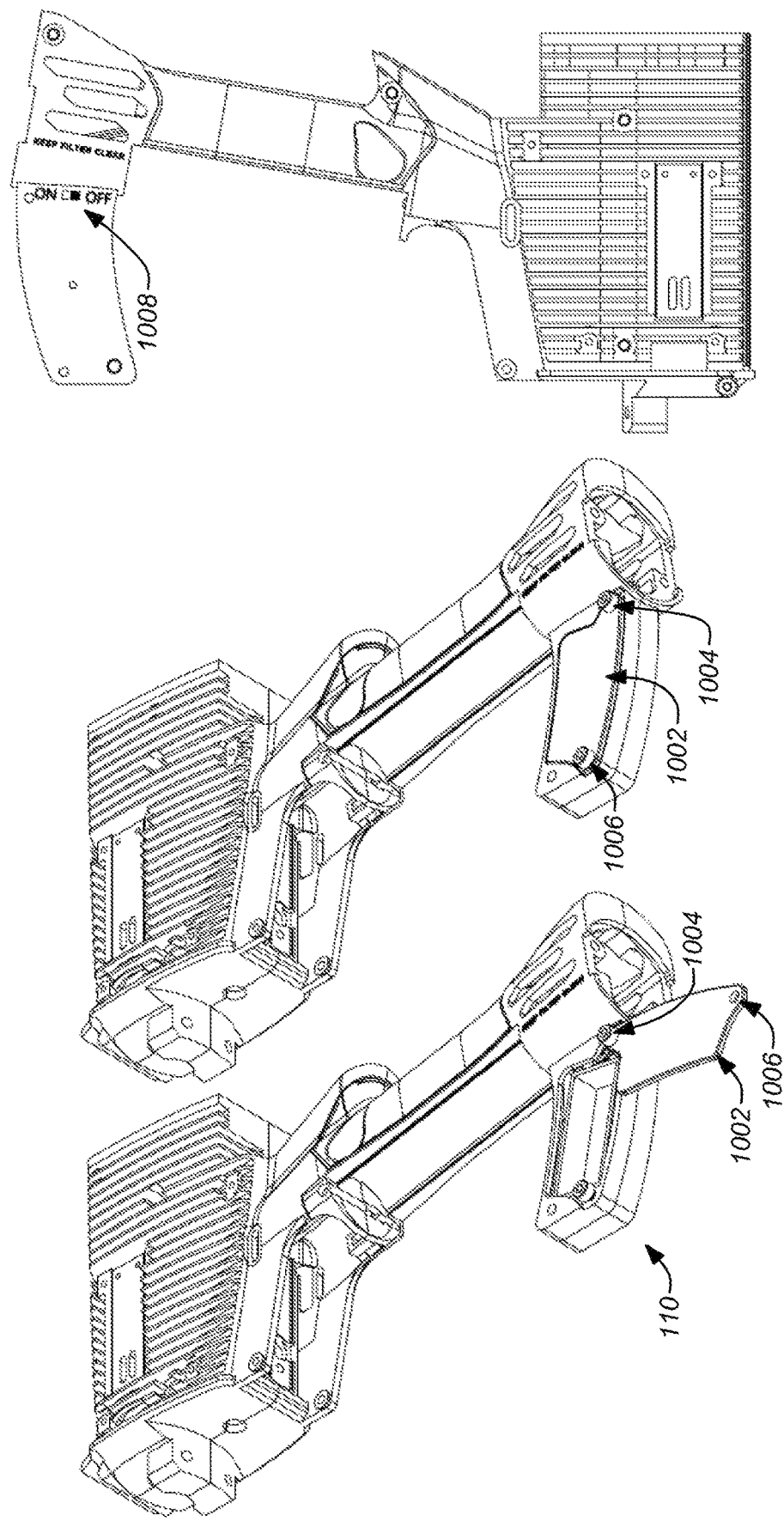
FIG. 10 illustrates an ignition battery compartment and access of an exemplary combustion driven fastener hand tool embodiment of the invention.

FIG. 10 illustrates an ignition battery compartment and access of an exemplary combustion driven fastener hand tool embodiment of the invention. The battery carrier section 110 includes a sliding cover 1002 which is pinned to rotate about a first point 1002 when a fastener is removed from a second point 1006. The sliding cover 1002 slides into a pocket of the battery carrier section 110 having a narrower width at the deepest edge of the pocket and a wider width at the opening edge. Note that FIG. 10 does not show the bracket 112 coupled between the battery carry section 110 and the fastener strip carrier 108 to reinforce the overall structure as shown in FIGS. 1B and 1E. On the side opposite the cover 1002, a power switch 1008 can be disposed for turning on power to the ignition circuit.

8. Piston Bumper for Combustion Driven Fastener Hand Tool

Figure 11:
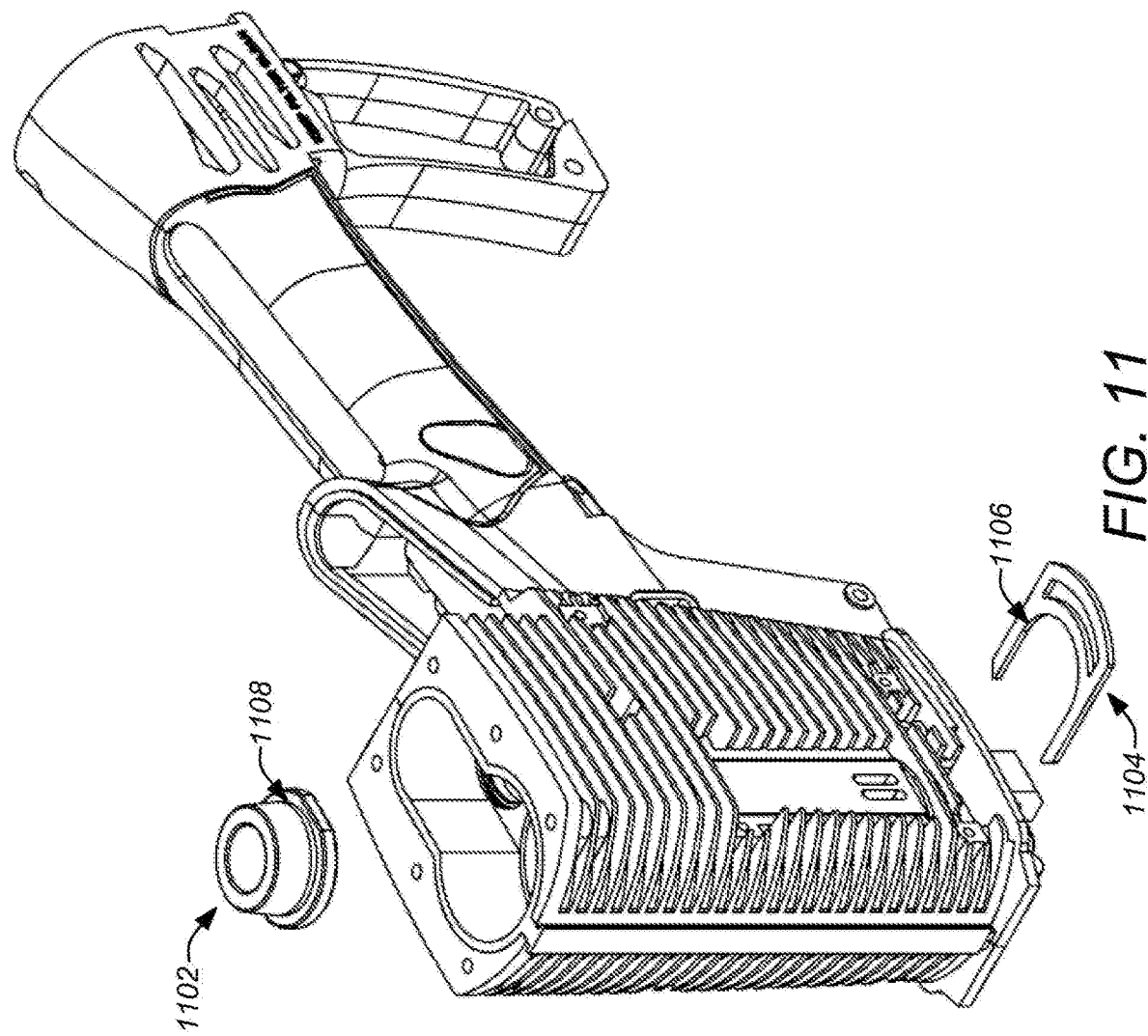
FIG. 11 illustrates replaceable piston bumper element of an exemplary combustion driven fastener hand tool embodiment of the invention.

FIG. 11 illustrates replaceable piston bumper element of an exemplary combustion driven fastener hand tool embodiment of the invention. The piston bumper 1102 is another wearable part (similar to the piston driver 802) which undergoes repeated impacts which must occasionally be replaced. In order to make replacement easy the piston bumper 1102 is readily removable after the top cap assembly 804 and piston driver 802 have been removed. See section 5 above. The piston bumper 1102 is installed into the open end of the piston bore and a clip 1104 ("U-clip") is installed into a slot in the side of the cast housing. The clip 1104 has an interior semi-circular edge 1106 which engages a groove 1108 in the piston bumper 1102 locking it into place. The piston driver 802 and top cap assembly 804 are then installed over the bumper 1102.

9. Exhaust Valves for Combustion Driven Fastener Hand Tool

Exhaust valves are employed to allow the combustion gases to be ejected after driving the fastener. After abruptly closing, negative pressure trapped in the piston chamber causes the piston driver to return to the start position. Stops and standoffs can be integrated directly into the exterior housing to control operation of the valves.

Figure 12A:
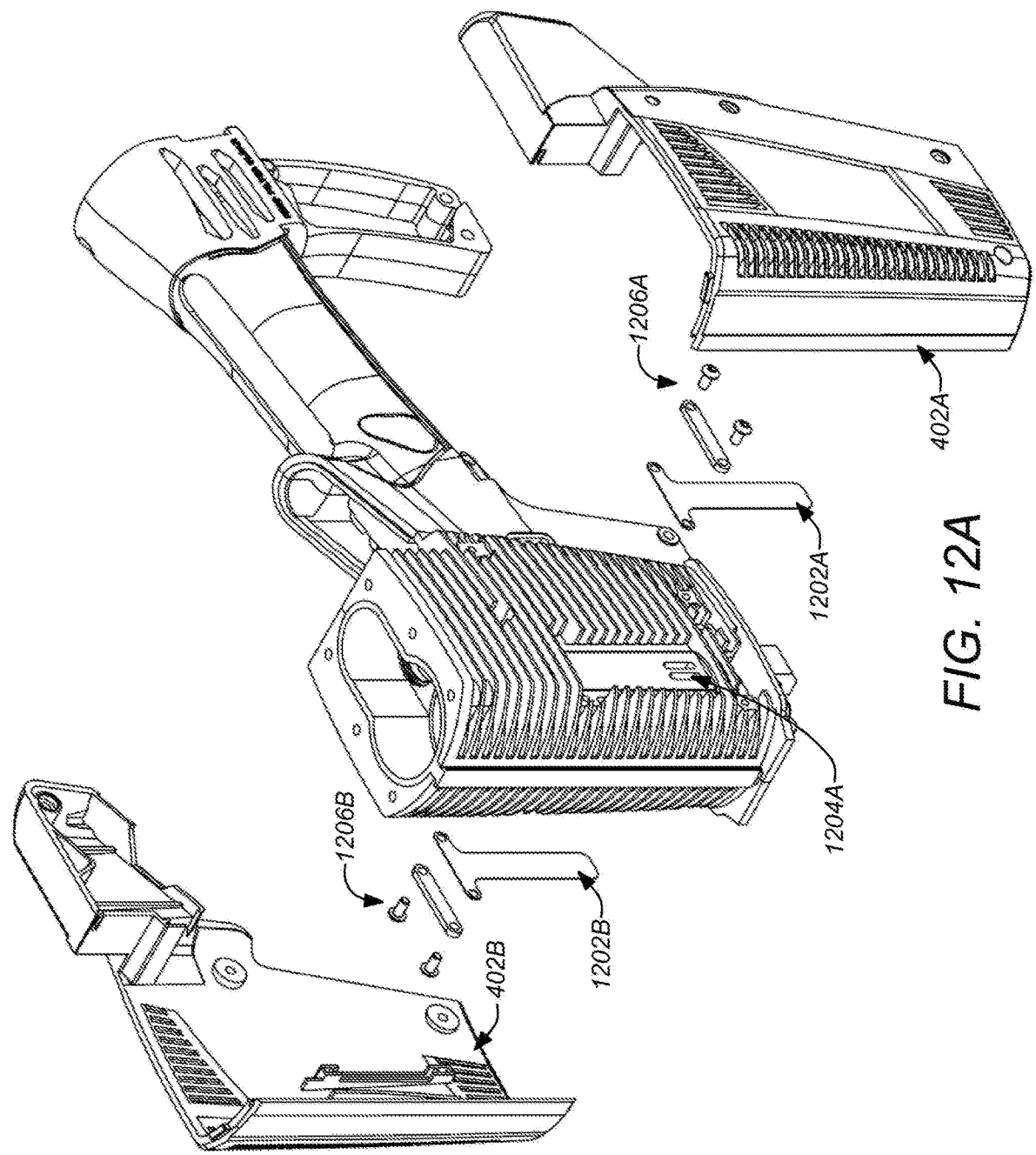
FIGS. 12A-12C illustrate exhaust valves of an exemplary combustion driven fastener hand tool embodiment of the invention.
Figure 12B:
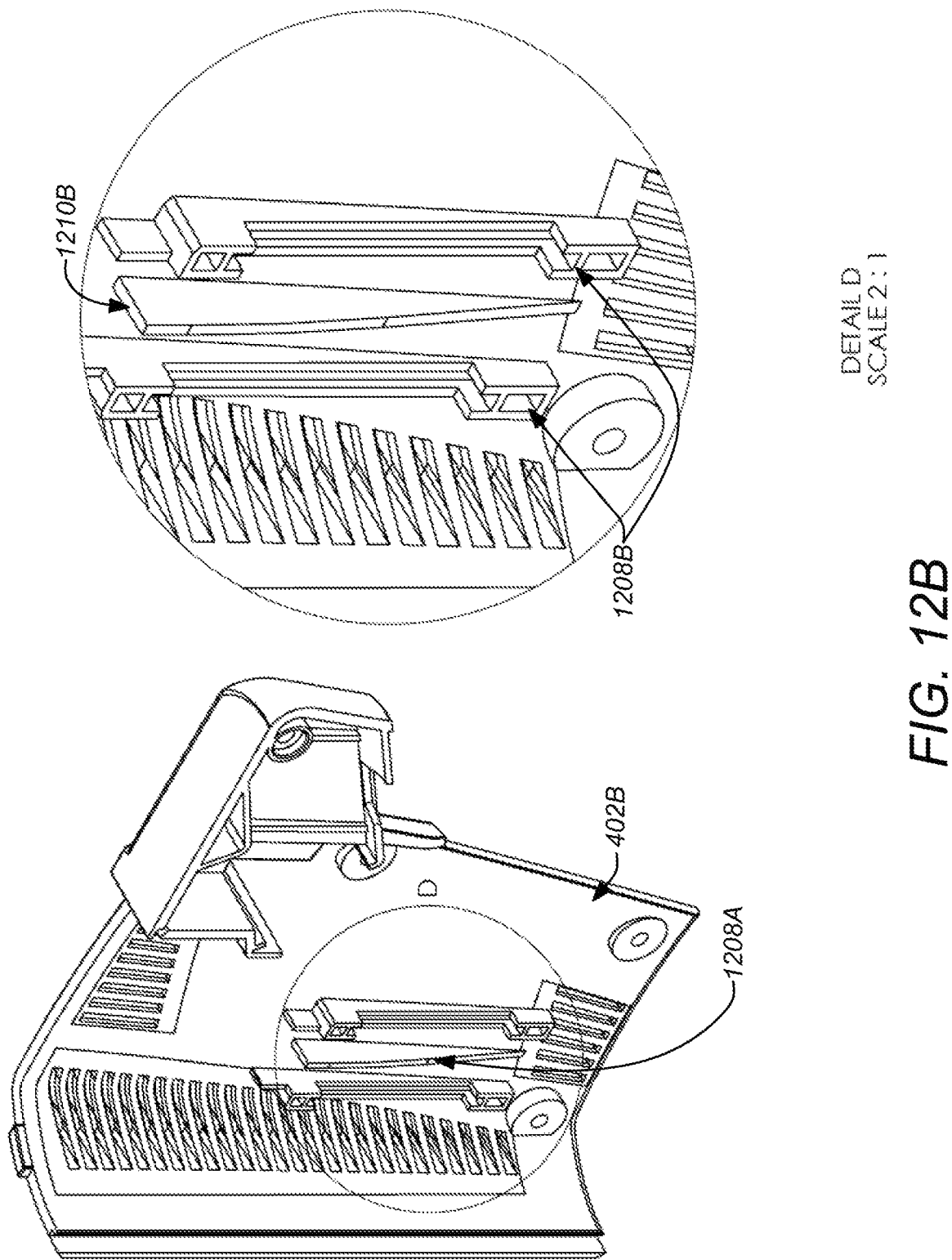
Figure 12C:
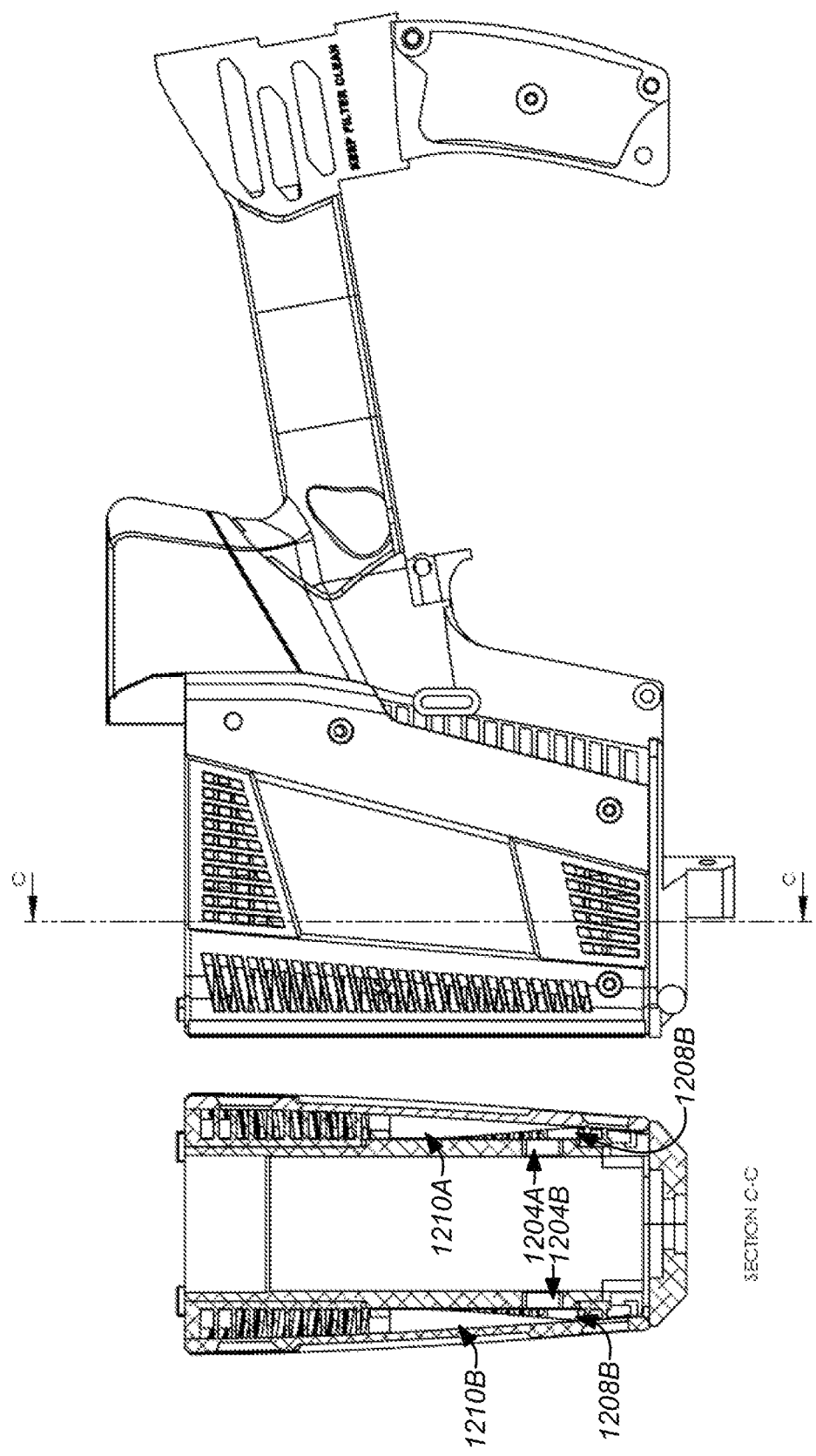

FIGS. 12A-12C illustrate exhaust valves of an exemplary combustion driven fastener hand tool embodiment of the invention. The combustion driven fastener hand tool can also incorporate a novel exhaust valve design. The exhaust valves 1202A, 1202B can be implemented as reed valves comprising a flat length of material, e.g. metal, secured at one end, e.g. with a stiffener and fasteners 1210A, 1210B. Exhaust gases from the piston chamber are directed through ports 1204A, 1204B in the primary housing 204A, 204B when the tool is operated. The opening gap of the valves 1202A, 1202B is controlled by stops 1210A, 1210B integrated into the interior surface of the exterior housing 402A, 402B. Each stop 1210A, 1210B can comprise a ramped section centered along the valve length which has a lowest end at the valve opening end. The exterior housing 402A, 402B also incorporates incorporates standoffs 1208A, 1208B in the interior wall. The standoffs and stops precisely set the valve opening gap in operation. As previously mentioned, the exterior housing can be produced as a molded plastic component.

10. Fuel Charging Safety Linkage for Combustion Driven Fastener Hand Tool

An embodiment of the invention can also incorporate a novel safety linkage used in the operation of the tool. The nose piece of the tool which contacts the point where a fastener is to be driven includes a sliding link which moves linearly toward and away from the workpiece surface in a channel within the nose piece. This linear motion is transmitted to an armature which has a slotted joint coupled to the opposite end of the sliding link. The armature rotates about a pinned joint and has an opposite end which pushes a valve causing it to open and charge combustion chamber with a fuel and air mixture.

FIGS. 13A-13D illustrate fuel charging, safety linkage, and trigger lockout of an exemplary combustion driven fastener hand tool embodiment of the invention. The sliding link 1302 of the nose piece 1300 is held in a channel and allowed to move linearly. One end of the sliding link 1302 can be pressed against a work piece surface (to be fastened) and the other end is coupled to an armature 1304. The coupling to the armature 1304 can be implemented through a slotted joint 1306 comprising a roller bushing 1308 coupled to the end of the sliding link 1302 which rolls in the slot of the armature 1304 reducing friction and eliminating any binding of the joint in use. The armature 1304 has a pinned joint 1310 about which it rotates under action from the sliding link 1302. The armature 1304 further includes a distal end 1312 which pushes against the fuel nozzle to charge the combustion chamber. See section 3 above, FIGS. 6B-6D, and FIGS. 7A-7B. The distal end 1312 is coupled to a wide roller bushing 1314 to provide rolling contact against the lever 1316 of the fuel nozzle reducing friction and eliminating any binding of the joint in use. It should be noted that return of the armature 1304 and sliding link 1302 to their original positions (with the sliding link 1304 extended) is provided by spring loading within the the nozzle and metering assembly.

As previously described, operation of the combustion driven fastener hand tool to drive a fastener is performed in two steps. The default state of the hand tool with a fuel cartridge 670 loaded is for pressurized fuel to occupy the metering volume 660 of the metering valve 622 (flowing through the pressure regulator 624 from the fuel cartridge 670). First the safety linkage is operated by pressing the sliding link 1302 against a work surface causing pressurized fuel to move (by closing the inlet valve 658A and opening the outlet valve 658B) from the metering volume 660 through the fuel nozzle 620 and through the fuel and air mixture pathway, past the fuel and air baffle and the open valve 720 and into the combustion chamber. Next, with the hand tool still held against the work surface to hold the inlet valve 658A closed, the user pulls the trigger 106 towards the hand grip causing the combustion chamber valve 720 to first close and then the triggering the ignition switch at the end of travel which causes a spark to be generated between the spark point and the disc on the valve stem as previously described. See section 4 and FIGS. 7A and 7B. If the safety linkage is not operated, however, embodiments of the invention can employ a trigger lockout mechanism to prevent any possible ignition.

Figure 13A:
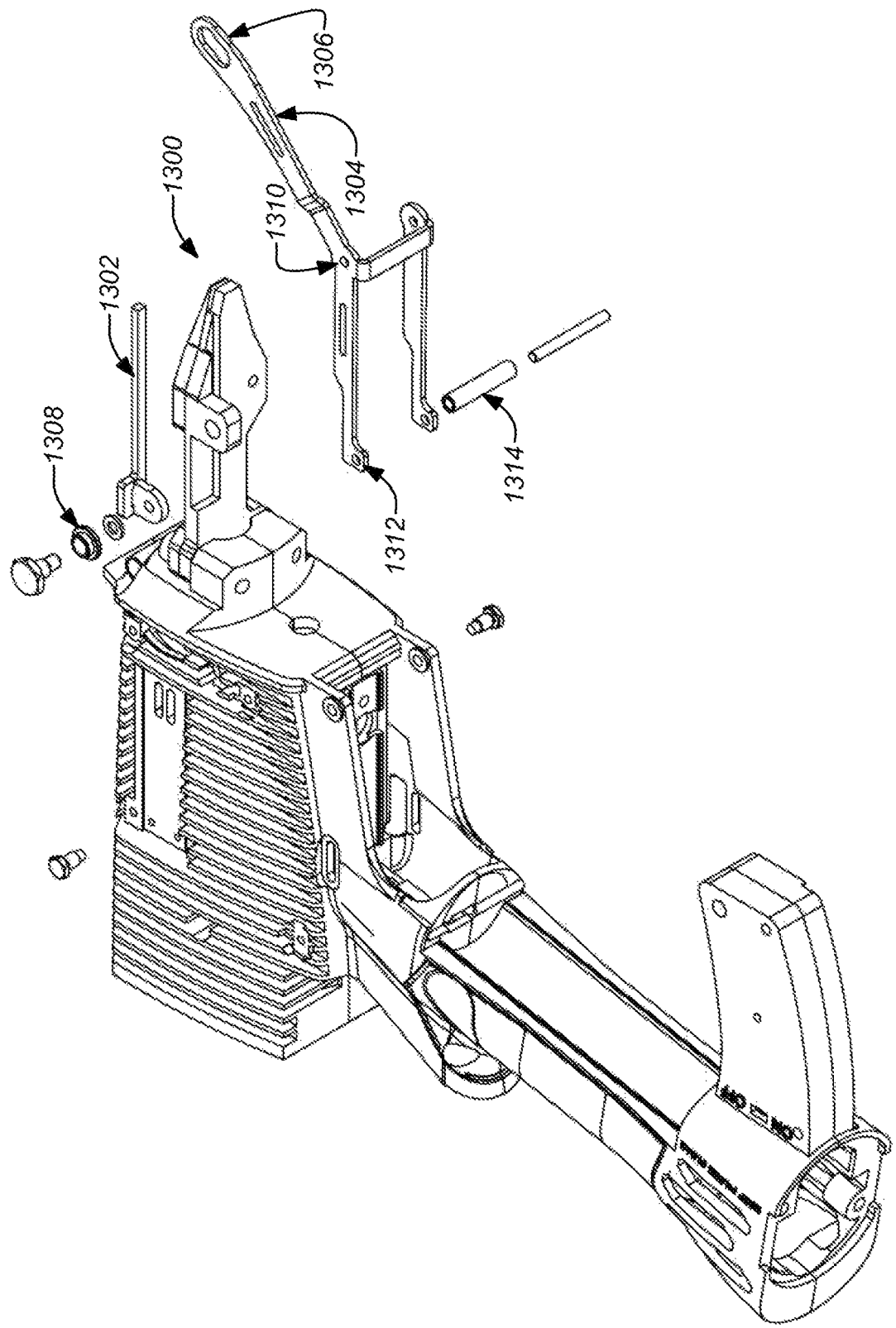
FIGS. 13A-13D illustrate fuel charging, safety linkage and trigger lockout of an exemplary combustion driven fastener hand tool embodiment of the invention.
Figure 13B:
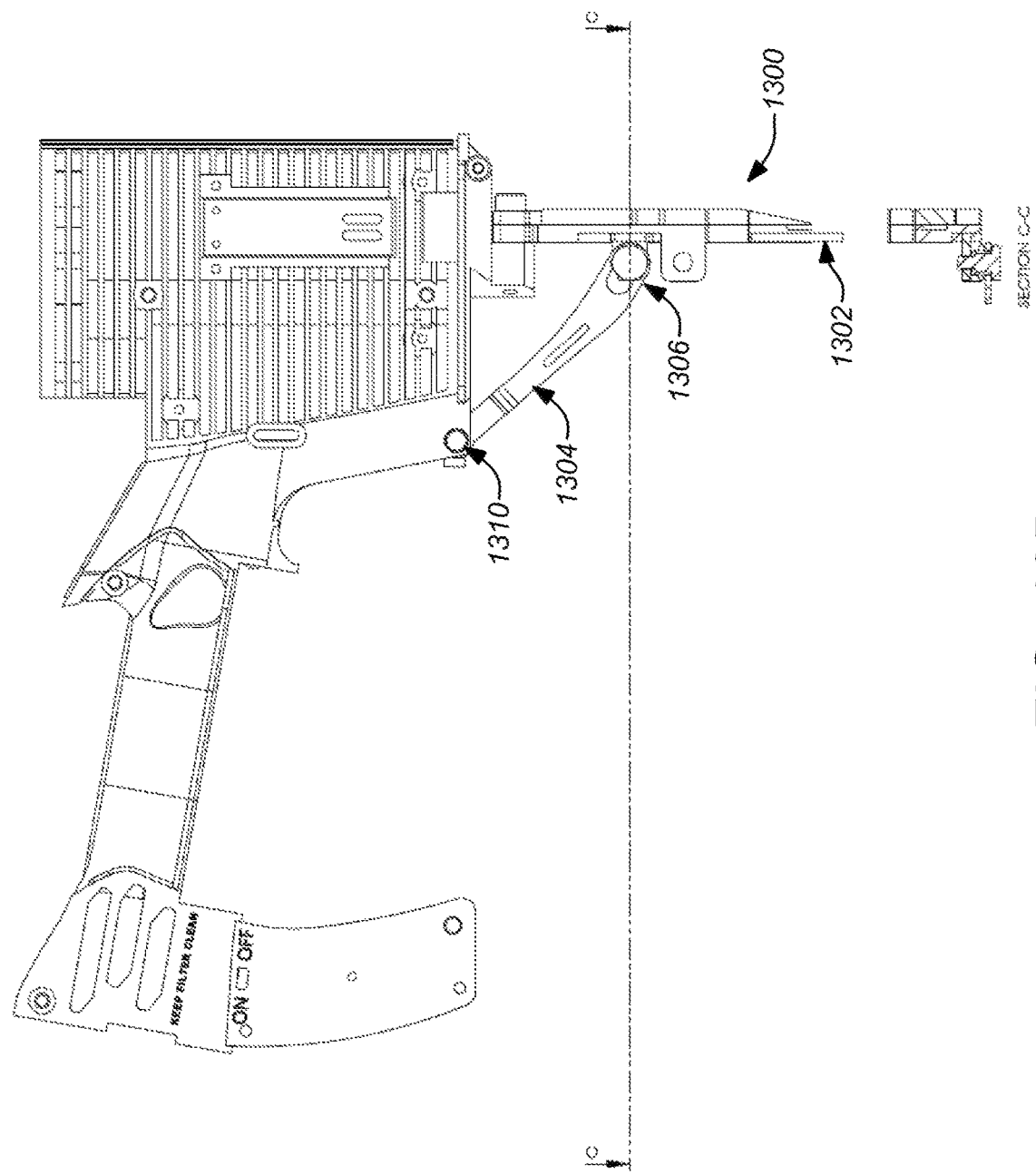
Figure 13C:
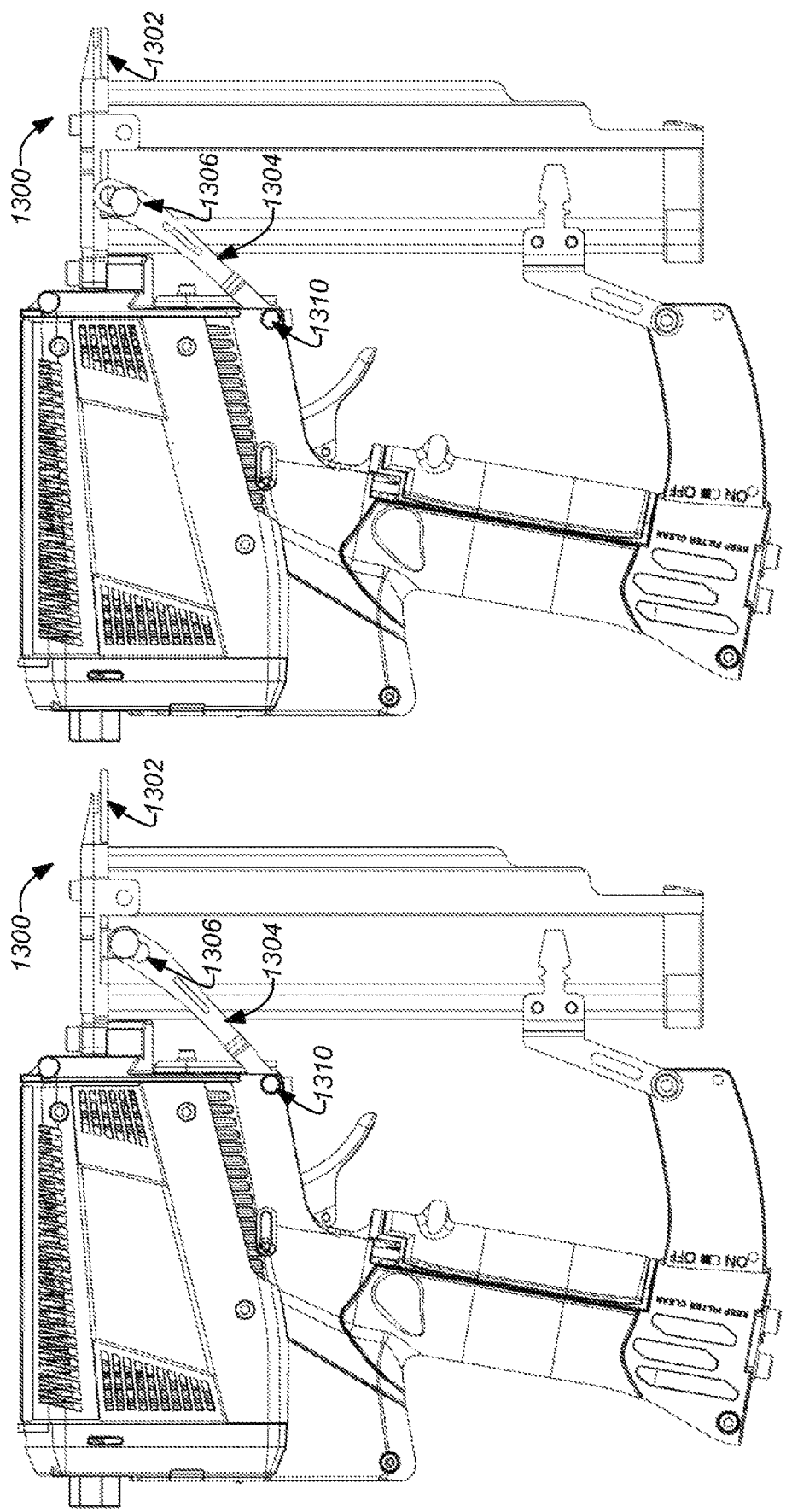
Figure 13D:
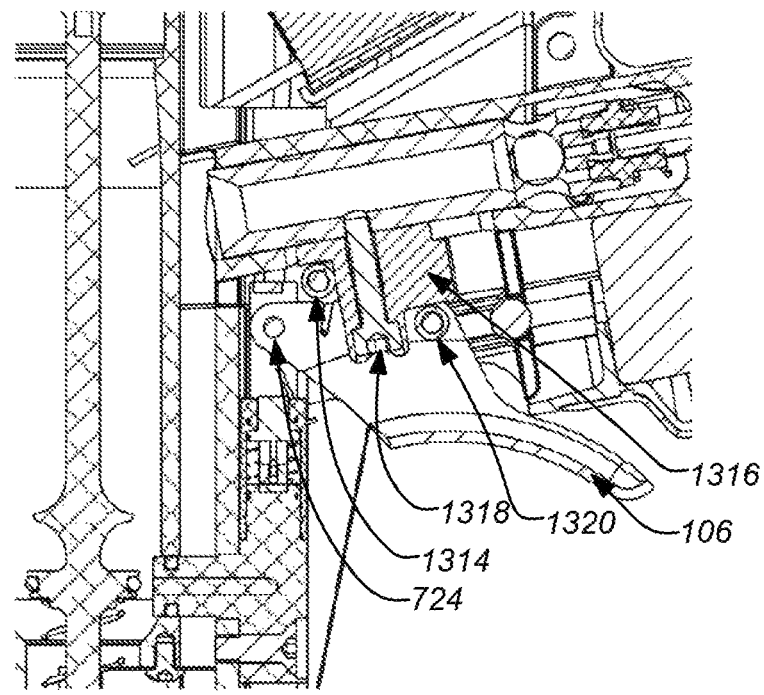
Figure 13D:
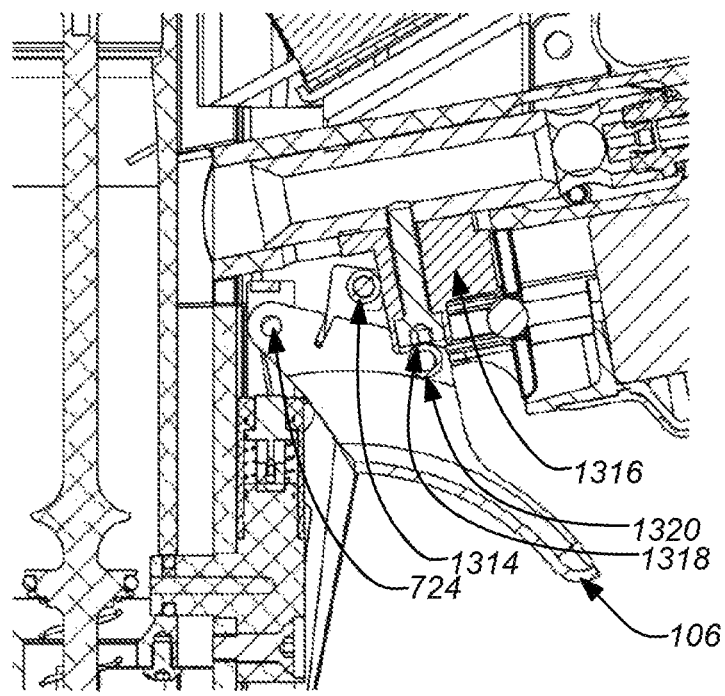

FIG. 13D shows the trigger lockout for an exemplary embodiment of the invention. The trigger is prevented from activating the ignition by employing the fuel nozzle lever 1316 to properly locate a pivot point 1318 for a pin 1320 on the trigger 106. The bottom panel shows the fuel nozzle lever 1316 pushed into the proper position by the roller bushing 1314 of the safety linkage to position the pivot point 1318 on the lever 1316 directly adjacent to the pin 1320 of the trigger 106. Accordingly, when the trigger 106 is pulled in with the lever 1316 in this position, the pinned joint 724 of the trigger will move downward a sufficient distance to close the chamber valve and trigger the ignition switch. (See section 4 and FIGS. 7A and 7B.) However, is the safety linkage is not actuated first as shown in the top panel, the pivot point 1318 will not be located adjacent to the pin 1320 of the trigger 106. In this case, pulling on the trigger 106 will move the pin 1320 upward into a recess behind the pivot point 1318 of the level 1316 and the pinned joint 724 will not move downward enough (if at all) to trigger the ignition switch.

This concludes the description including the preferred embodiments of the present invention. The foregoing description including the preferred embodiment of the invention has been presented for the purposes of illustration and description. It is not intended to be exhaustive or to limit the invention to the precise forms disclosed. Many modifications and variations are possible within the scope of the foregoing teachings. Additional variations of the present invention may be devised without departing from the inventive concept as set forth in the following claims.

What is claimed is:

1. A combustion driven fastener apparatus, comprising a fuel system subassembly including:
    a fuel nozzle having a metered fuel input port and fuel and an air mixture output port, the fuel nozzle disposed in a bore of the combustion driven fastener apparatus; and
    a metering valve having a fuel input port and a metered fuel output port, the metering valve disposed in the bore with the metered fuel output port coupled to the metered fuel input port, the metering valve comprising a hollow cylindrical housing having a cap at each end and a central dual valve stem therebetween;
    wherein movement of the dual central valve stem closes an inlet valve at one end and opens an outlet valve at an opposite end in a coordinated manner to release a metered amount of fuel through the outlet valve while preventing additional fuel through the inlet valve.

2. The apparatus of claim 1, wherein the bore includes a step to locate the metering valve at a set position along a length of the bore.

3. The apparatus of claim 1, wherein the fuel nozzle and the metering valve are cylindrically configured and the metering valve has a larger maximum diameter than the fuel nozzle.

4. The apparatus of claim 1, wherein the cap at each end comprises a common cap design having an annular groove.

5. The apparatus of claim 1, wherein the fuel system subassembly further includes a biasing spring disposed between the fuel nozzle and the metering valve and moving the fuel nozzle towards the metering valve compresses the biasing spring therebetween such that the metered fuel input port of the fuel nozzle pushes against the metered fuel output port of the metering valve causing the movement of the dual central valve stem.

6. The apparatus of claim 1, wherein fuel pressure behind the fuel input port of the metering valve forces the dual central valve stem such the that inlet valve is normally open and the outlet valve is normally closed.

7. The apparatus of claim 1, wherein the fuel system subassembly further includes a pressure regulator having a fuel cartridge input port and a fuel output port, the fuel output port coupled to the fuel input port of the metering valve.

8. The apparatus of claim 7, wherein the pressure regulator is disposed in the bore.

9. The apparatus of claim 1, wherein the bore is disposed in a hand grip section of the combustion driven fastener apparatus.

10. The apparatus of claim 9, further comprising a cap fastened over the bore of the hand grip section to secure the fuel system subassembly in place, the cap including a clip portion extending from an end of the hand grip section adjacent and parallel along a side of the hand grip section.

11. A method of making a combustion driven fastener apparatus, comprising a fuel system subassembly including:
    disposing a fuel nozzle in a bore of the combustion driven fastener apparatus, the fuel nozzle having a metered fuel input port and fuel and an air mixture output port; and
    disposing a metering valve in the bore behind the fuel nozzle with the metered fuel output port coupled to the metered fuel input port, the metering valve having a fuel input port and a metered fuel output port, the metering valve comprising a hollow cylindrical housing having a cap at each end and a central dual valve stem therebetween;

wherein movement of the dual central valve stem closes an inlet valve at one end and opens an outlet valve at an opposite end in a coordinated manner to release a metered amount of fuel through the outlet valve while preventing additional fuel through the inlet valve.

12. The method of claim 11, wherein the bore includes a step to locate the metering valve at a set position along a length of the bore.

13. The method of claim 11, wherein the fuel nozzle and the metering valve are cylindrically configured and the metering valve has a larger maximum diameter than the fuel nozzle.

14. The method of claim 11, wherein the cap at each end comprises a common cap design having an annular groove.

15. The method of claim 11, wherein the fuel system subassembly further includes a biasing spring disposed between the fuel nozzle and the metering valve and moving the fuel nozzle towards the metering valve compresses the biasing spring therebetween such that the metered fuel input port of the fuel nozzle pushes against the metered fuel output port of the metering valve causing the movement of the dual central valve stem.

16. The method of claim 11, wherein fuel pressure behind the fuel input port of the metering valve forces the dual central valve stem such the that inlet valve is normally open and the outlet valve is normally closed.

17. The method of claim 11, wherein the fuel system subassembly further includes a pressure regulator having a fuel cartridge input port and a fuel output port, the fuel output port coupled to the fuel input port of the metering valve.

18. The method of claim 17, wherein the pressure regulator is disposed in the bore.

19. The method of claim 11, wherein the bore is disposed in a hand grip section of the combustion driven fastener apparatus.

20. The method of claim 19, further comprising fastening a cap over the bore of the hand grip section to secure the fuel system subassembly in place, the cap including a clip portion extending from an end of the hand grip section adjacent and parallel along a side of the hand grip section.

* * * * *